United States Patent [19]
Shapiro et al.

[11] Patent Number: 5,300,944
[45] Date of Patent: Apr. 5, 1994

[54] VIDEO DISPLAY SYSTEM AND METHOD OF USING SAME

[75] Inventors: Leonid Shapiro, Lakeside; Robert W. Shaw, Escondido; Randall S. Farwell, San Diego, all of Calif.

[73] Assignee: Proxima Corporation, San Diego, Calif.

[21] Appl. No.: 950,451

[22] Filed: Sep. 24, 1992

Related U.S. Application Data

[63] Continuation of Ser. No. 690,531, Apr. 23, 1991, abandoned, which is a continuation-in-part of Ser. No. 616,178, Nov. 19, 1990, Pat. No. 5,276,436, which is a continuation-in-part of Ser. No. 586,506, Sep. 21, 1990, Pat. No. 5,225,875, which is a continuation-in-part of Ser. No. 546,238, Jun. 29, 1990, abandoned, which is a continuation-in-part of Ser. No. 506,621, Apr. 9, 1990, abandoned, which is a continuation-in-part of Ser. No. 506,429, Apr. 9, 1990, abandoned, which is a continuation-in-part of Ser. No. 472,668, Jan. 30, 1990, abandoned, which is a continuation-in-part of Ser. No. 222,144, Jul. 21, 1988, abandoned.

[51] Int. Cl.⁵ .............................................. G09G 3/36
[52] U.S. Cl. ................................................. 345/88; 345/152
[58] Field of Search ............... 340/701, 703, 784, 793, 340/716; 359/36, 54, 58, 59; 358/11, 12, 21 R, 140, 141, 241, 455, 456, 457, 458, 459, 230; 395/100; 345/88, 152

[56] References Cited

U.S. PATENT DOCUMENTS

| | | | |
|---|---|---|---|
| 4,531,160 | 7/1985 | Ehn | 358/230 |
| 4,536,856 | 8/1985 | Hiroishi | 395/100 |
| 4,631,692 | 12/1986 | Broedner | 340/701 |
| 4,760,387 | 7/1988 | Ishii et al. | 340/716 |
| 4,779,083 | 10/1988 | Ishii et al. | 340/784 |
| 4,827,255 | 5/1989 | Ishii | 340/703 |
| 4,886,343 | 12/1989 | Johnson | 340/784 |
| 4,931,787 | 6/1990 | Shannon | 340/784 |
| 5,138,303 | 8/1992 | Rupel | 340/703 |

Primary Examiner—Richard Hjerpe
Attorney, Agent, or Firm—Bernard L. Kleinke; Jerry R. Potts

[57] ABSTRACT

A multiple color display system employing a low speed active matrix panel and a color enhancing unit for defining composite pixel groupings in the active matrix panel and for causing each grouping to produce in excess of 24 thousand different color shading levels.

23 Claims, 14 Drawing Sheets

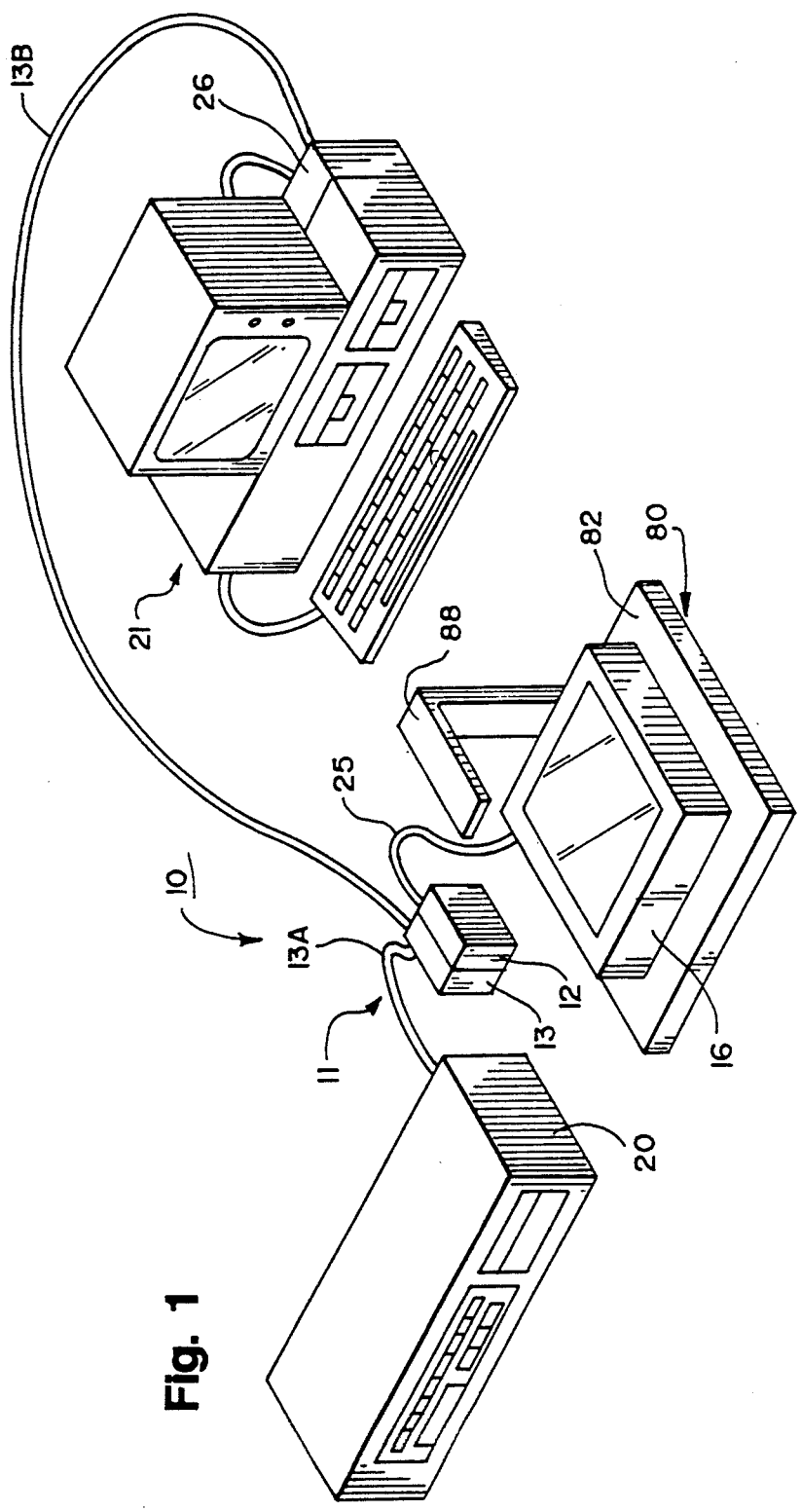
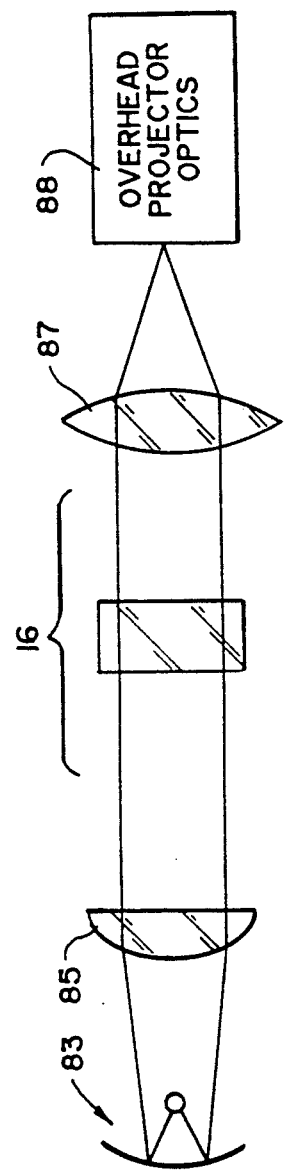
Fig. 1
Fig. 2

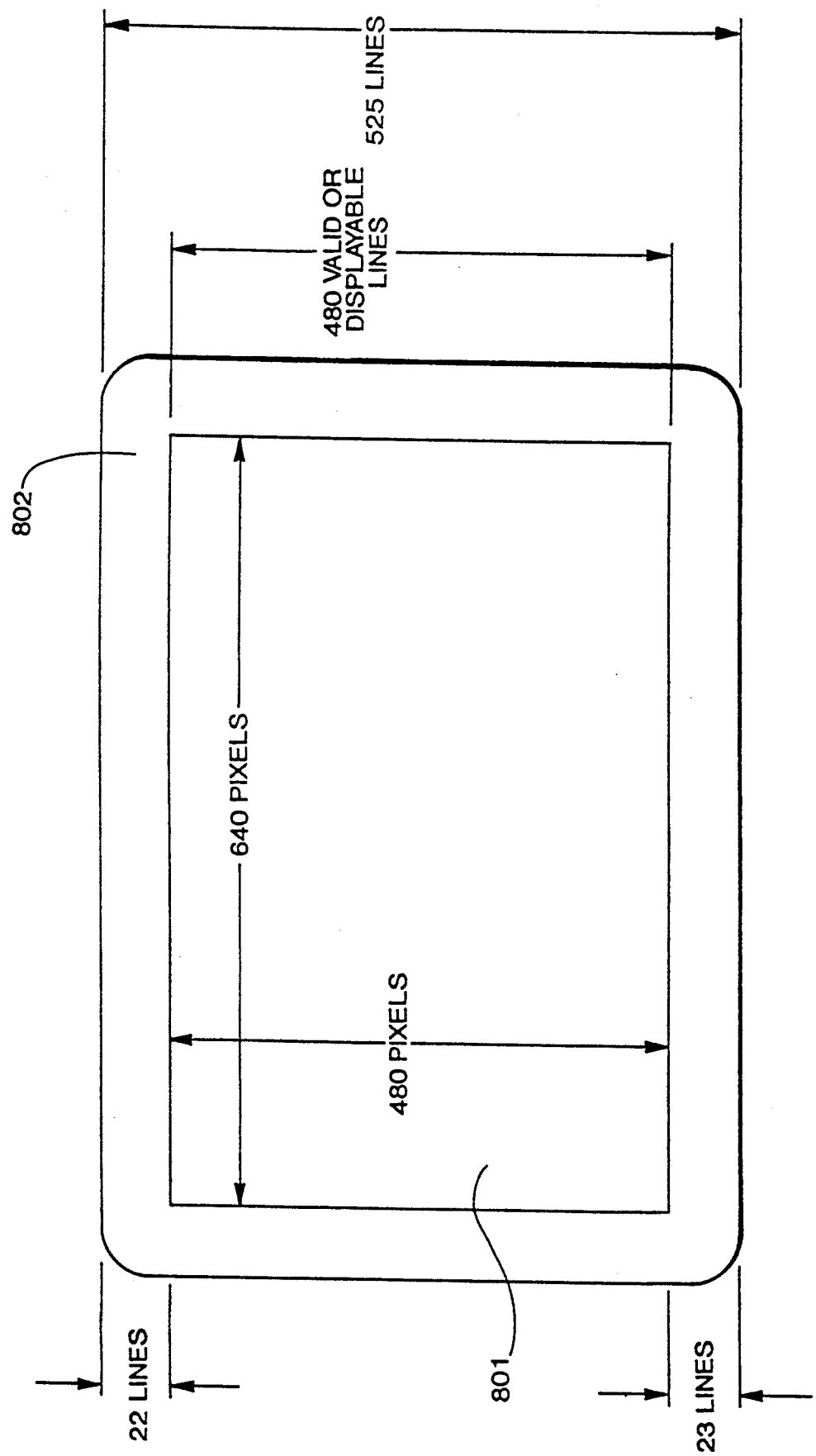

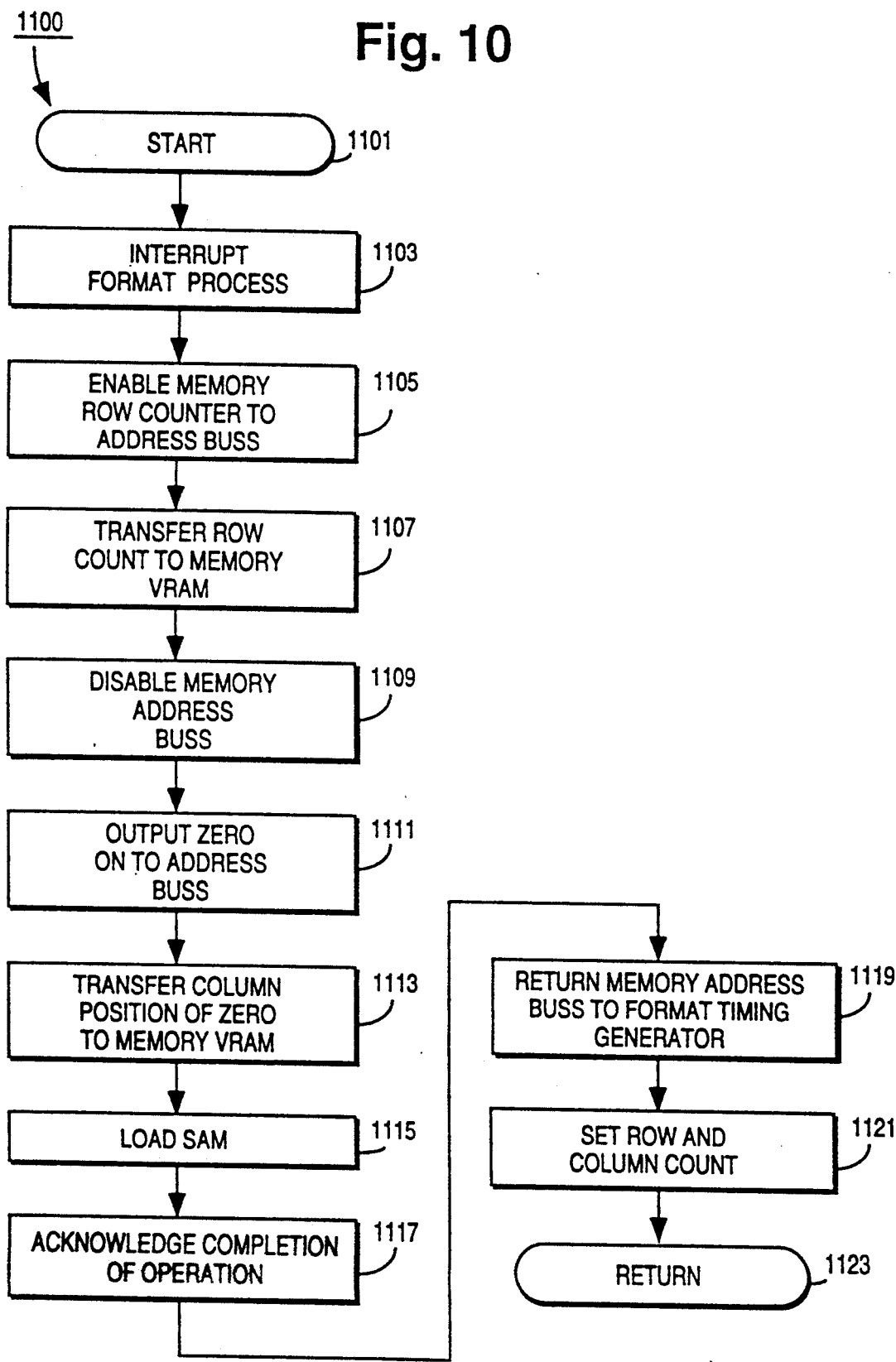

VIDEO DISPLAY SYSTEM AND METHOD OF USING SAME

CROSS REFERENCE TO RELATED APPLICATIONS

This is a continuation of application Ser. No. 07/690,531, filed on Apr. 23, 1991, now abandoned, which is a continuation-in-part of U.S. patent application Ser. No. 07/616,178 filed Nov. 19, 1990, entitled "TELEVISION SIGNAL PROJECTION SYSTEM AND METHOD OF USING SAME,",now U.S. Pat. No. 5,276,436, which is a continuation-in-part of U.S. patent application Ser. No. 07/586,506 filed Sep. 21, 1990, entitled "HIGH SPEED COLOR DISPLAY SYSTEM AND METHOD OF USING SAME,",now U.S. Pat. No. 5,225,875, which is a continuation-in-part of U.S. patent application Ser. No. 07/546,238 filed Jun. 29, 1990 entitled "STACKED DISPLAY PANEL CONSTRUCTION AND METHOD OF MAKING SAME,",now abandoned, which is a continuation-in-part of U.S. patent application Ser. No. 07/506,621 filed Apr. 9, 1990, entitled "STACKED DISPLAY PANEL CONSTRUCTION AND METHOD OF MAKING SAME,",now abandoned which is a continuation-in-part of U.S. patent application Ser. No. 07/472,668 filed Jan. 30, 1990, entitled, "LIQUID CRYSTAL DISPLAY PANEL SYSTEM AND METHOD OF USING SAME,", now abandoned, which is a continuation-in-part of U.S. patent application Ser. No. 07/222,144 filed Jul. 21, 1988, entitled "GRAY SCALE SYSTEM FOR VISUAL DISPLAYS," now abandoned. The foregoing patent applications are incorporated herein by reference.

TECHNICAL FIELD

The present invention relates in general to a video display system, and a method of using it. The invention more particularly relates to a method and apparatus for displaying a large projected full color display image generated from a television video signal.

BACKGROUND ART

There have been various different types and kinds of full color video display systems. Inventive techniques for producing such a full-color display include the use of direct view video or television monitors.

While such techniques have been satisfactory for some applications, direct video and television monitors are generally limited with respect to the size of the viewing image, due to the limited screen area associated with the cathode ray tube employed by such monitor units. Moreover, such systems have been relatively expensive to manufacture, since direct view video monitors are expensive.

Therefore, it would be highly desirable to have a new and improved full-color display system, which can produce a large television image for group viewing, without employing an expensive large direct view television monitor.

One attempt to over come the problem of having a limited viewing area has been to employ a rear view projection system, where a set of red, green and blue images are projected onto the rear side of a large transparent screen for viewing purposes. While this technique may satisfactory for some applications, it has proven to be relatively expensive to manufacture and requires a large cumbersome display unit cabinet which is difficult to move from place to place. In addition, the brightness of the viewed images is somewhat restricted or impaired due to the loss of light in traversing the transparent screen.

Therefore, it would be highly desirable to have a new and improved video display system for displaying large color images produced from a television signal which would be relatively inexpensive and that would not be difficult to move from place to place for viewing purposes.

Another attempt to overcome the problem associated with poor luminance in a large screen viewing system, has been to employ a direct front projection system. The direct projection system is similar to the rear view system except that the red, green and blue images are projected onto the front surface of a large reflective screen from a projection unit disposed in front of the screen. Again, while such a technique has proven satisfactory for some applications, the projection unit has typically been mounted in a permanent location relative to the screen, for proper focusing and to assure that a sufficient amount of light is projected onto the screen to provide an image with sufficient brightness for viewing purposes.

Therefore, it would be highly desirable to produce large screen viewing images having a relatively high luminance level and not being required to be permanently mounted or otherwise positioned.

Another attempt to overcome the problem associated with poor luminance has been to use a high speed active matrix panel with an overhead projector for the display of information. Such flat high speed active matrix panels have been capable of producing full color displays with thousands of bright colors. Such a large number of colors however has been possible only by using very sophisticated duty cycling techniques so that individual pixels in the liquid crystal display device may be selectively modulated to produce multiple intensity levels. While such duty cycle techniques have been successful for the high speed active matrix liquid crystal panels, a less sophisticated approach may be warranted for slower speed active matrix panels. Therefore, it would be highly desirable to be able to produce thousands of different bright colors in a low speed liquid crystal display panel without using a sophisticated duty cycle technique.

DISCLOSURE OF INVENTION

Therefore, the principal object of the present invention is to provide a new and improved video display system and method of using it to produce large displayable images generated from conventional signals.

Another object of the present image is to provide such a new and improved video display system, which is relatively inexpensive to manufacture and which is easily transmitted for convenient viewing purposes.

Yet another object of the present invention is to provide such a new and improved video display system which produces a video image having a large number of discrete color shadings having relatively high luminance levels.

Briefly, the above and further objects of the present invention are realized by providing a multiple color display system employing a relatively low speed display panel, such as an LCD active matrix panel, adapted for positioning on a conventional photographic projector for displaying large video images. The display panel is coupled to an interface unit for converting conventional video signals into analog signals for driving a controller employing a pattern circuit coupled between the display panel and a memory storage device driven by the interface unit. The pattern circuit enables pixel elements in the low speed active matrix panel to be configured in a group, such as a group of four pixel elements. In this regard, the four pixel elements are combined to define a single composite pixel group where combinations of subpixels in each of the groups are selectively energized to 1 of 8 levels so that in excess of 24,000 different color shading may be exhibited by the composite pixel group.

The controller also employs a format timing generator for formatting the video signal so that it may be displayed in a conventional matrix array, such as a 640 by 480 matrix array, employed by the low speed display device. The system utilizes relatively inexpensive subassembly units, such as a video cassette recorder, a conventional photographic projector and screen, a color enhancing interface controller and a display device, such as an active matrix display panel adapted for positioning on the photographic projector.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 1 is a pictorial, partially diagrammatic view of a television projection system, which is constructed in accordance with the present invention, and which is illustrated being employed in a television signal driven, overhead projection arrangement;

FIG. 2 is a diagrammatic view of the system and the arrangement of FIG. 1;

FIG. 8 is a schematic diagram illustrating a matrix array developed by the format timing generator of FIG. 5.

FIG. 10 is a flow chart diagram of the interrupt firmware of the color enhancing controller of FIG. 3.

BEST MODE FOR CARRYING OUT THE INVENTION

Figure 3:
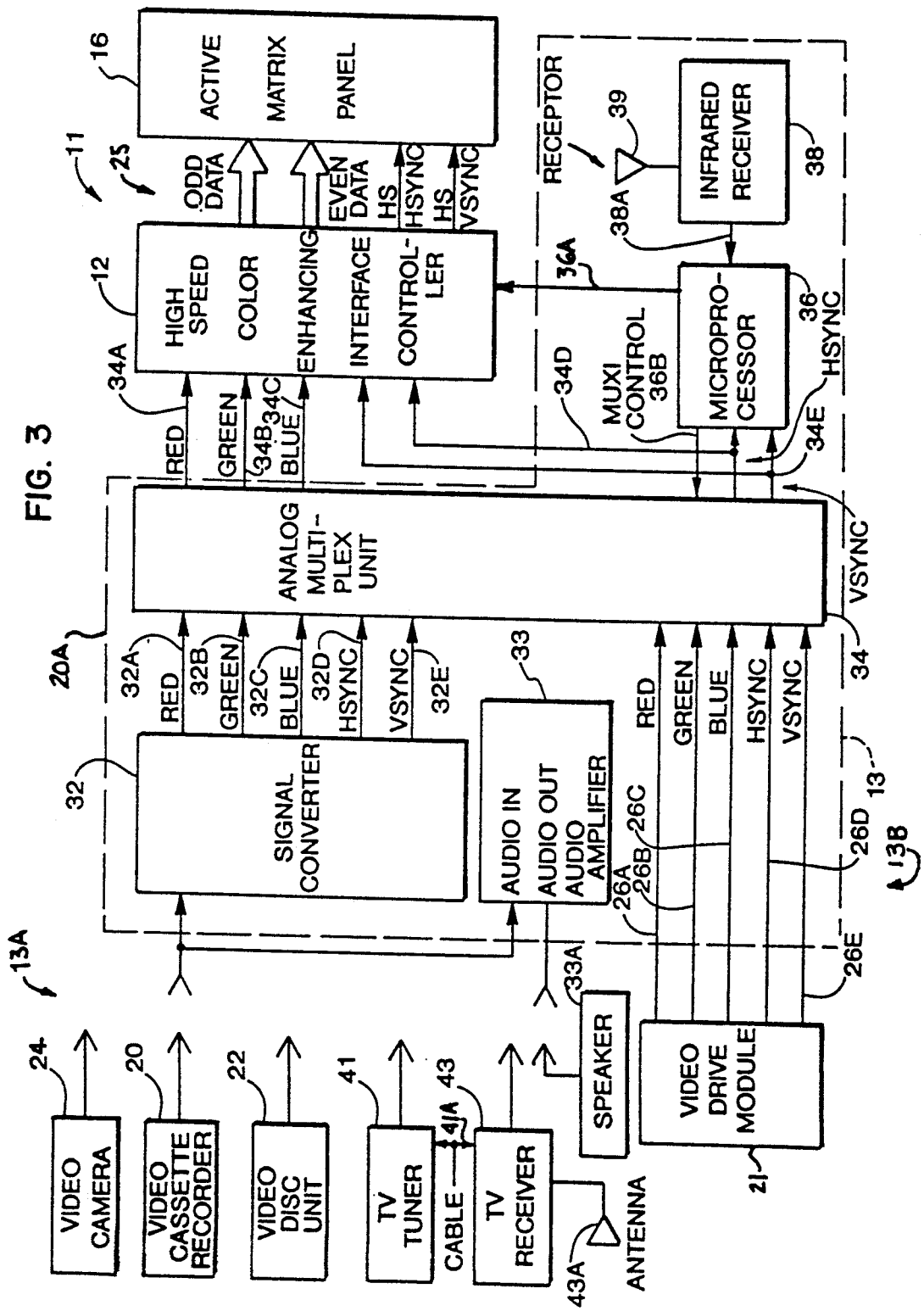
FIG. 3 is a block diagram of a display drive unit of FIG. 1.

Referring to the drawings, and more particularly to FIG. 1, there is illustrated a television signal projection system 10, which is constructed in accordance with the present invention, and which is adapted for use as a video display system capable of displaying a very large full color screen image. Thus, the system 10 is a display projection system, and is employed in an overhead projection arrangement.

As shown in FIG. 1, the system 10 is adapted for use in an arrangement employing a television signal generrating source, such as a video cassette recorder 20 with a conventional video cassette (not shown), and an overhead projection system 80. The video cassette recorder 20 supplies a conventional National Television Standards Committee (NTSC) signal (USA) or a PAL signal (Europe) as generated for displaying an image from a broadcast television signal source.

The system 10 generally comprises a display drive unit 11 for translating the conventional television video output signal from the video cassette recorder 20 into video signals capable of thousands of different color shadings and hues for display by a display device, such as a thin film transistor active matrix liquid crystal display panel 16 for displaying color images produces from the video signals. The drive unit 11 is also capable of translating the conventional computer video output signals produced by a personal computer 21 having a video drive module 26 as more fully disclosed in copending U.S. patent application Ser. No. 07/586,506 mentioned herein. In this regard, the drive unit 11 includes a color enhancing interface controller 12 coupled by an interface unit 13 to either the video cassette recorder 20 or the video drive module 26. The interface controller 12 includes a format timing generator 45 for formatting the television signal for displaying images on the display device 16. The interface unit 13 is connected to the recorder 20 and the module 26 by a pair of cables 13A and 13B respectively.

Figure 12:
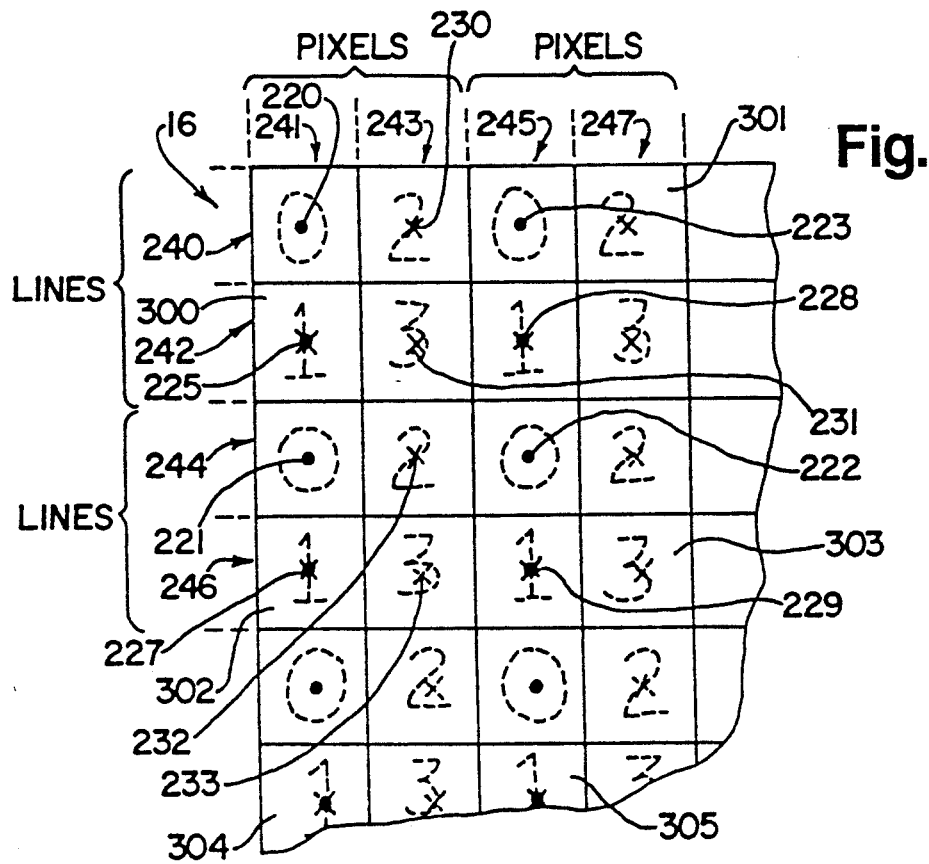
FIG. 12 is a diagrammatic representation of a group of pixel element within an active matrix panel of FIG. 4.

Referring now to FIG. 12, there is shown the active matrix panel 16 illustrating a group of composite pixels 300-305 arranged in rows or lines, such as lines 240, 242, 244 and 246, and columns or pixels 241, 243, 245 and 247. As each composite pixel 300-305 is substantially the same only composite pixel 300 will be described hereinafter in greater detail.

Considering now the composite pixel 300 in greater detail with reference to FIG. 12, the composite pixel 300 consists of a 2×2 pixel element matrix divided into a group of pixel elements 220, 225, 230 and 231 identified as 0, 1, and 3 in dotted lines The four pixel element matrix consists of two lines or rows 240 and 242, respectively and two columns of pixel groupings 241 and 243, respectively. The rows and columns of pixel elements define a pixel group, such as the group 300 for example. As will be explained hereinafter in greater detail, a color enhancing interface controller 12, causes selected ones of the active matrix pixel elements in each of the composite pixel groups, such as group 300, to be assigned intensity levels for forming the composite pixel grouping In this regard, as best seen in FIG. 12, the input data for the pixel element 220 is the same for pixel element 230 and thus, is used to define an intensity level to the pixel element at line 240, column 241 as well as the pixel element at line 240, column 243. In a similar manner, the input data for pixel element 225 at line 242 column 220 is used to define the intensity level for the pixel element 231 at line 242, column 243. Each pixel element, such as pixel element 220 includes three sub-pixel elements (not shown) one for each primary color red, green, and blue. In such an arrangement therefore, it should be understood that in each one of the groups, such as the group 300, the individual pixel elements, such as pixel elements 220, 225, 230 and 231 will be selectively energized to form up to eight shades of color for each of the primary colors red, green and blue. Thus, by combining selectively certain ones of the pixel elements, such as the pixel elements in composite group 300, in excess of 24,000 different color combinations may be produced in the composite pixel 300.

Although in the preferred embodiment of the present invention, the drive unit 11 is shown interfaced to the video cassette recorder 20 it will be understood by those skilled in the art that other similar television signal generating sources, such as a video disc unit 22, a video camera 24 a television tuner 41 or a television receiver 43 having an antenna 43A could also be employed as shown in FIG. 3.

The interface unit 13 converts the NTSC signal into an analog signal indicative of the red, green, blue color components of the display image along with the horizontal and vertical synchronizing or scanning signals HSYNC and VSYNC for generating a standard television scan raster in which the image is displayed. The color enhancing interface controller 12 not only provides the necessary control functions to couple the interface unit 13 to the display device 16 but also quantizes the conventional RGB analog signal so that a very large number of colors can be displayed by the active matrix panel 16. As best seen in FIG. 1, the color enhancing interface controller 12 is coupled to the active matrix panel by a cable 25.

The video cassette recorder 20 may be any conventional video cassette recorder, such as manufactured by SONY Corporation or RCA, Inc. which is capable of generating a standard NTSC signal when playing a video cassette with prerecorded video television image information. The video cassette recorder 20 can be connected to a CATV cable 41A or a standard television antenna for coupling line broadcast signals to the drive unit 11. The display device 16 in cooperation with the video cassette recorder 20 and the overhead projector system 80 enables a user to view any prerecorded video television image information in a large projected image format.

Considering now the overhead projection device 80 in greater detail with reference to FIGS. 1 and 2, the projection device 80 generally includes a flat transparent projection surface 82 which is adapted to support the active matrix panel 16 for image projection purposes. The overhead projection device 80 includes an illumination bulb and a reflector shown generally at 83 (FIG. 2) for transmitting light through the panel 16.

In order to collimate the light produced by the bulb and reflector 83 into the panel, a collimating Fresnel lens 85 is disposed on the underside of the active matrix panel 16. A focusing lens 87, preferably a Fresnel lens is disposed on the upper side of the panel 16 for converging the light exiting the panel 16 into an overhead projection optics assembly 88. In this regard the optics assembly 88 enables light passing through the panel 16 to be focused onto a projection screen or other suitable viewing surface (not shown), for audience display purposes.

While in the preferred form of the present invention the Fresnel lens 85 and 87 are disposed on the panel 16, it will be understood by those skilled in the art that the lens may be disposed in a case (not shown) for supporting the lens 85 and 87 in a spaced-apart manner from the panel 16. In this regard, the television signal projection system 10 and the method of using it, enables a full color display image to be projected on to any suitable viewing surface in a relatively easy and convenient manner using relatively inexpensive commercially available equipment which may be easily set up for viewing purposes.

The active matrix thin film transistor liquid crystal panel 16 includes a pixel matrix array for generating a selected number of image elements in a 640 by 480 pixel array having a primary color arrangement (red, green, blue) for forming the prerecorded television video image stored on the video cassette cartridge (not shown). It will be understood by those skilled in the art that the television video image may be generated from a television signal which is broadcast and received by a television receiver or generated by a television camera directly coupled to the interface unit 13 as shown in FIG. 3. The active matrix panel 16 is more fully described in copending U.S. patent application Ser. No. 07/586,506 referenced herein.

TABLE I

| Type of Video Signal | Video Signal Source HSYNC rate |
|---|---|
| NTSC | 15.750 KHz |
| VGA Graphics | 31.47 KHz |

As best seen in FIGS. 1 and 3, the system 10 is adapted for use with any conventional television signal source for producing a video image, such as the NTSC and VGA GRAPHIC signals. Table I specifies the HSYNC rate for two of the conventional video signal sources. As will be explained hereinafter in greater detail, although the system 10 converts such signals, into re-formatted signals that are capable of driving the active matrix panel 16 having a 640 by 480 pixel array only a 320×480 pixel image is displayed when displaying the NTSC video signals.

FIG. 8 illustrates a typical display method of the present system 10. In this regard, for illustrative purposes a typical NTSC display format of 525 lines is shown with a 640 by 480 pixel array, shown generally at 801. The NTSC signal occupies a display area shown generally at 802 and consists of two interlaced 60Hz fields of 262.5 line each, combining to give a 30Hz, 525 lines of video information. Because the vertical resolution of the panel 16 is less than the vertical resolution provided by the NTSC signal, the present system 10 effectively fits the NTSC display configuration into the 480 lines of vertical resolution for the panel 16. The controller 12 formats the NTSC signal by ignoring the first twenty two horizontal lines and the last twenty three horizontal lines in each frame of video information, resulting in 480 valid lines (525 lines −22 lines −23 lines =480 lines). This is an effective practice since the disregarded lines consist of the "overscan" (invisible) lines of the extreme top and bottom portions of the displayed image, which typically contains little or no meaningful video information.

The width of the NTSC picture is also matched or formatted into a 640 pixel width for use by the panel 16. In this regard, the controller 12 adjusts the sampling rate of the video signal as will be explained hereinafter in greater detail.

Considering now the interface unit 13 in greater detail with reference to FIG. 3, the interface unit 13 generally includes a signal converter 32 for converting the NTSC television signal from the video cassette recorder 20 into an analog RGB signal suitable for driving the controller 12. The NTSC television signal is coupled to the input of the signal converter 32 by a conductor 20A. As best seen in FIG. 3, the interface unit 13 has its input also coupled to the video drive module 26 whose output signals are already in an analog RGB format suitable for driving the controller 12. In this regard, the video drive module 26 in the personal computer 21 has five output signals red, green, blue, horizontal synchronization (HSYNC), and vertical synchronization (VSYNC) coupled to the interface unit 13 on the cable 13B having a set of conductors 26A-E respectively.

In order to enable a user to select between input signals from the video cassette recorder 20 and the video drive module 26, the interface unit 13 also includes an analog multiplex unit 34 and a microprocessor 36. The analog multiplex unit 34 is a conventional multiplexer allowing either the output signals from the signal converter 32 or the output signals from the video drive module 26 to be coupled to the color enhancing interface controller 12. The microprocessor 36 determines which of the video source standards (VGA Graphics, NTSC, PAL, etc.) are to be coupled to the color enhancing interface controller 12. In this regard, the microprocessor 36 allows only one of the source standard signal to be coupled to the controller 12. Signals are coupled from the analog multiplex unit 34 to the controller 12 on a set of conductors 34A-E respectively. Once the microprocessor 36 determines the type of video standard to be supplied to the controller 12, the microprocessor 36 generates appropriate format data and commands on a command/data line 36A (FIG. 5) for establishing a proper sample rate and format of lines and pixels locations for driving the active matrix unit 16. The microprocessor 36 also generates a control signal (MUX CONTROL) which switches the multiplex unit 34 to receive and pass to the controller 12, either the input signals from the signal converter 32 or the input signals from the video drive module 26. The control signal, MUX CONTROL is coupled to the multiplex unit 34 on a conductor 36B.

The interface unit 13 also includes an infrared receiver 38 having a receptor 39 for receiving infrared signals from a remote infrared transmitter unit (not shown). In this regard, a user may actuate the infrared transmitter unit for generating a signal which causes the microprocessor 36 to search for a different type of video source signal by switching the multiplex unit 34. The infrared receiver 38 is a conventional infrared receiver unit whose output is coupled to the microprocessor 36 on a conductor 38A.

For the purpose of amplifying the low level audio signal that accompanies the video source signals, the interface unit 13 also includes an audio amplifier 33 having an output jack adapted to be connected to a conventional speaker, such as speaker 33A. The audio amplifier 33 is conventional, such as a model TDA1013B sold and manufactured by Signetics and described in the Signetic "Linear Data Manual," Volume 1 (1989) pages 7-207.

Considering now the signal converter 32 in greater detail with reference to FIG. 3, the converter 32 is of a type well known to those skilled in the art, such as a TDA 3330 unit manufactured by Motorola and described in the Motorola Linear/Interface Devices Data Book, page 9-183 through 9-190, and in Motorola Application note AN1019D. Other type of converters for converting a PAL signal or a SECAM signal to an RGB signal are also well known. For example a combination PAL-SECAM-NTSC to RGB converter is available from SGS THOMSON at 1000 East Bell Road, Phoenix, Arizona under part number TEA 5640C as described in the SGS THOMSON Video IC's Data Book, pages 1211-1227. As the signal converter 32 is well known, it will not be described herein in greater detail. The output signals of the signal converter 32 are coupled to the analog multiplex unit 34 on a set of conductors 32A-E carrying the respective signals of red, green, blue, horizontal synchronization (HSYNC) and vertical synchronization (VSYNC).

Figure 4:
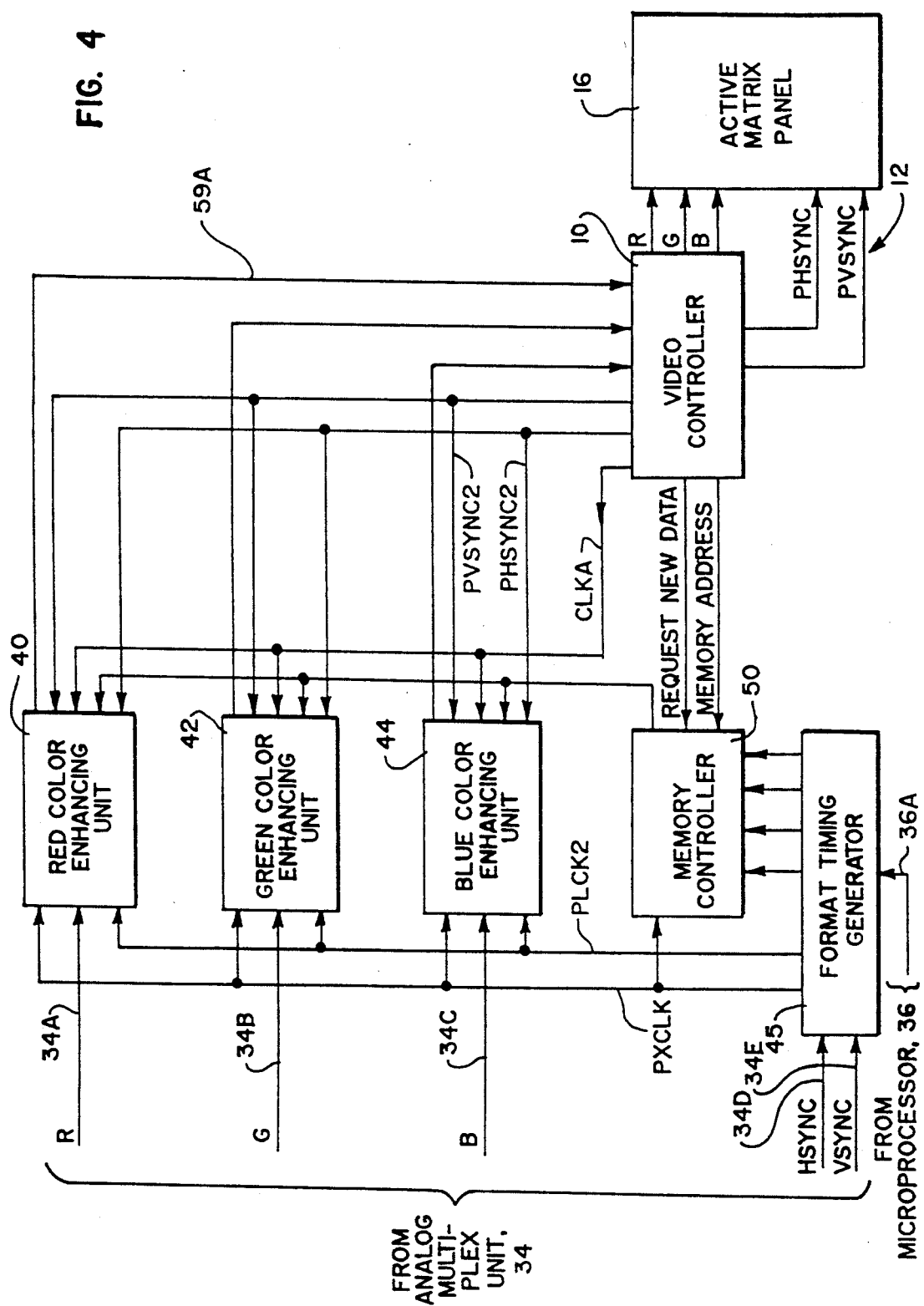
FIG. 4 is a block diagram of a color enhancing interface controller of FIG. 3.

Considering now the color enhancing interface controller 12 in greater detail with reference to FIGS. 3 and 4, the controller 12 is coupled between the active matrix panel 16 via cable 25 and the output of the analog multiplex unit 34. In this regard, the output signals from the analog multiplex unit 34, red, green, blue, horizontal synchronization and (HSYNC) vertical synchronization (VSYNC) are coupled to the input of controller 12 on a set of conductors 34A-E respectively.

The color enhancing interface controller 12 as best seen in FIG. 4, generally comprises a video controller 18 for controlling the video data supplied to the active matrix panel 16, a set of color enhancing units 40, 42, 44 for quantizing the video data supplied from the interface unit 13, a memory controller 50 for controlling the storing and retrieval of the quantized video data, and a format timing generator 45 for helping to format the video data to be displayed. As the memory controller 50 is substantially similar to the controller described in copending U.S. patent application Ser. No. 07/616,178, only the color enhancing units 40, 42, 44 and formatting timing generator 45 will be considered in greater detail.

Figure 5:
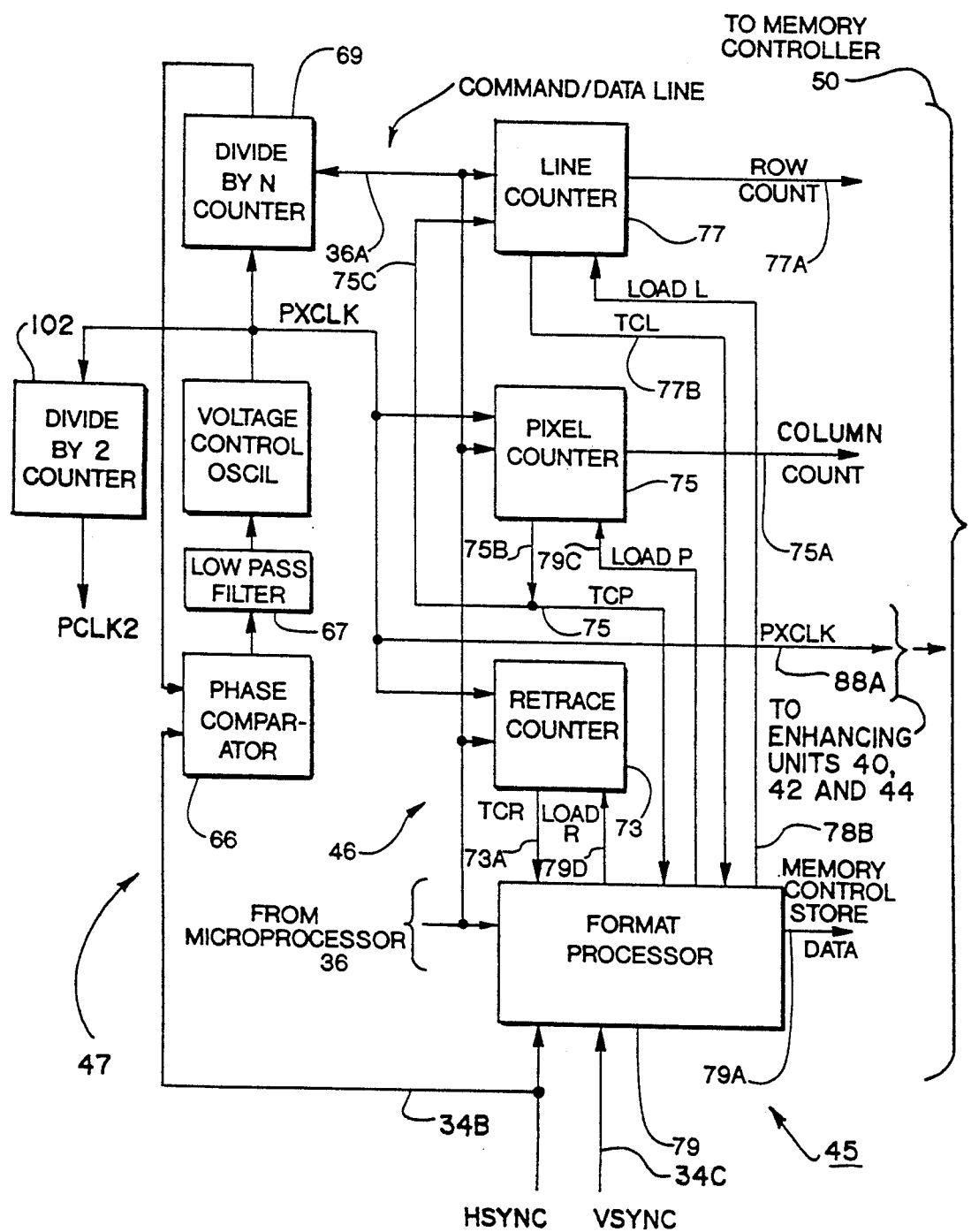
FIG. 5 is a functional block diagram of a format timing generator of the color enhancing interface controller of FIG. 3.

Considering now the format timing generator 45 in greater detail with reference to FIGS. 4 and 5, the format timing generator 45 generally comprises a programmable counter arrangement 46 for helping to format the video data to be stored in the controller 12, a programmable pixel clock generator 47 for establishing a proper sampling rate based upon the type of video signal being coupled to the controller 12, and a divide by two counter 102 for helping to establish a proper storing sequence of video data.

As best seen in FIG. 5, the programmable pixel clock generator 47 is a conventional phase lock loop arrangement including a phase comparator 66, a low pass filter 67, a voltage control oscillator 68, and a programmable divider or divide by N counter 69. The programmable pixel clock generator 47 utilizes a reference clock signal coupled from the output of the analog multiplex unit 34. The reference signal is identified by the HSYNC signal and is coupled on a conductor 34D to the input of the phase comparator 66. An output pixel clock signal PXCLK for synchronizing the storing of the video data in the respective enhancing units 40, 42 and 44 is derived from the output of the voltage controlled oscillator 68. The sampling rate of the voltage controlled oscillator 68 is a function of the output of the programmable divider 69 as will be described hereinafter in greater detail.

Considering now the programmable divider 69 in greater detail with reference to FIG. 5, the programmable divider 69 is programmed by the microprocessor 36 to help establish a proper sampling rate for storing the video data. The following example will be instructive. Assuming the video standard coupled to the controller 12 is a NTSC standard requiring a sampling rate of 14.333 MHz or 910 samples for every line of display data. In this regard, a division of 910 is required to produce the desired sampling rate as shown by the following formula:

HSYNC rate (NTSC standard) ≈ 15.750 KHz

Sampling rate = 15.750 KHz × 910 = 14.333 MHz.

As will be explained hereinafter, 910 pixels are sampled per line, however 270 pixels of the 910 pixel samples represent excess data and is disregard. In this regard, if the video standard is VGA graphics, for example, a division of 800 is required to produce a sample rate of 25.175 MHz. In this regard, the HSYNC signal is 31.47 KHz multiplied by 800 to produce the desired sampling rate of 25.175 MHz. Again, a given number of the 800 samples represent excess data, i.e. 160 samples. These 160 samples are disregarded, the first 80 samples and the last 80 samples in every line.

Figure 9B:
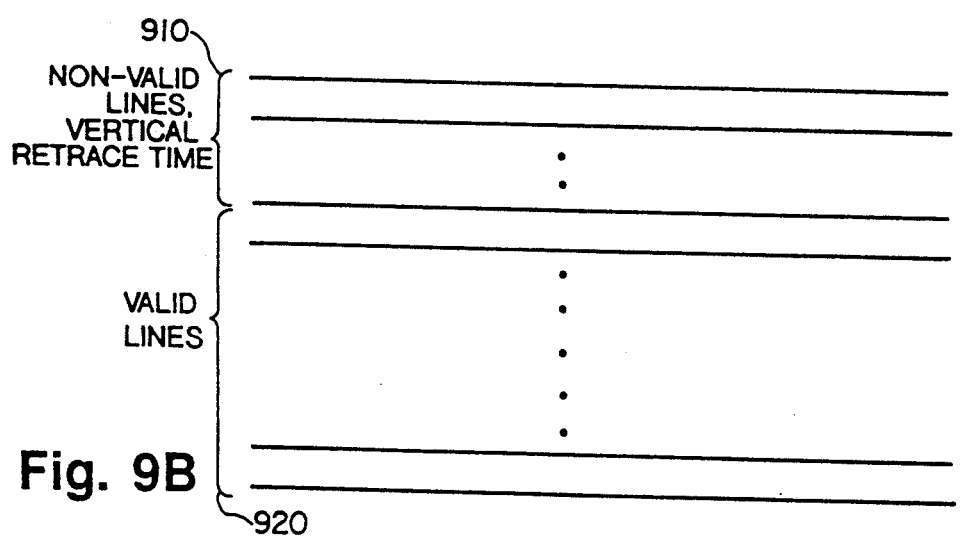
FIG. 9B is a vertical formatting timing diagram for helping to understand the operation of the format timing generator of FIG. 5.
Figure 9A:
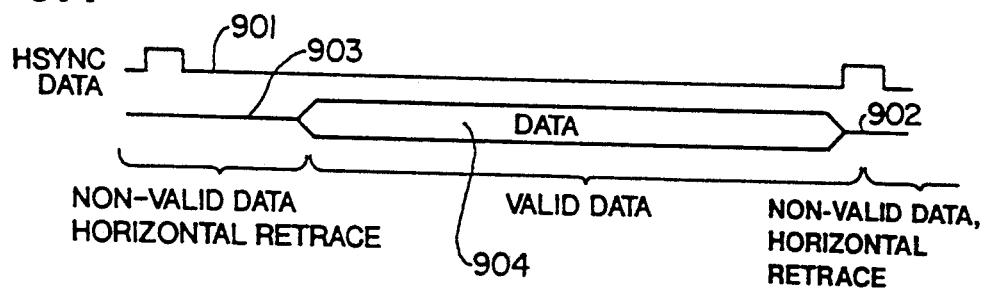
FIG. 9A is a horizontal formatting timing diagram for helping to understand the operation of the format timing generator of FIG. 5.

Referring now to FIG. 9A, a horizontal synchronization signal (HSYNC DATA) is shown generally at 901. The pixel location disregard for storage purposes as described above are shown as a non-valid data group 902 immediately before the HSYNC DATA signal 901 goes to a logical high level and a non-valid data group 903 immediately after the HSYNC DATA signal 901 goes to a logical high level. The pixel locations between groups 902 and 903 represents a valid data group 904 for displaying on the panel 16. For the purpose of further explanation, the HORIZONTAL RETRACE period occurs when the HSYNC DATA signal 901 is a logical high.

Considering now the programmable counter arrangement 46 in greater detail with reference to FIG. 5, the programmable counter arrangement 46 generally comprises a retrace counter 73 for helping to establish the number of vertical retrace lines in a frame of displayed information, a pixel counter 75 for helping to establish the number of valid pixels in a single line of displayed information and for helping to establish the number of horizontal retrace pixels between lines of displayed information, a line counter 77 for helping to establish the number of valid lines in a frame of displayed information and a format processor or controller for helping to coordinate the operation of the above mentioned counters in cooperation with the microprocessor 36.

The format controller 79 under the control of the microprocessor 36 generates load signals LOAD R, LOAD P, and LOAD L which enables the loading of predetermined counts into the retrace counter 73, the pixel counter 75 and the line counter 77 for storing video data in each of the color enhancing units 40, 42 and 44 in a proper format for access and display on the display unit 16. The load signals, LOAD R, LOAD P and LOAD L are connected between the format controller 79 and the retrace counter, pixel counter 75 and line counter 77 on a set of conductors 79D, 79C and 79B respectively. A connector 36A connected between the microprocessor 36, the format controller 79, the programmable divider 69, and each of the above referenced counters 73, 75 and 75 allows command instructions and the predetermined formatting data to be transferred from the microprocessor 36 for establishing proper formatting.

In order to enable the format processor 79 to generate the necessary control signal for enabling the memory controller 50 to store the video information and control memory operations, each of the counters 73, 75 and 75 provide terminal count signals TCR, TCP, and TCL to the format processor 79. The terminal count signals are conducted to the processor 79 on conductors 73A, 75B and 77B respectively. The format processor 79 enables the memory controller 50 to store all even field lines of even memory addresses in the bit map memories and odd field lines at odd memory addresses. Storing video information in this manner, enables the video information to be retrieved from the bit map memories in each respective enhancing unit 40, 42 and 44 in a combined interlaced line format to generate the 480 vertical line resolution utilized by the display device 16.

In operation, the microprocessor 36 determines what video source is to be displayed and sends the proper divide by command to the programmable divider 69 via a command/data line signal on a conductor 36A. The operation of the microprocessor 36 will now be described in greater detail with reference to the flow diagram of FIG. 6 which illustrates the steps executed by the microprocessor 36.

Figure 6:
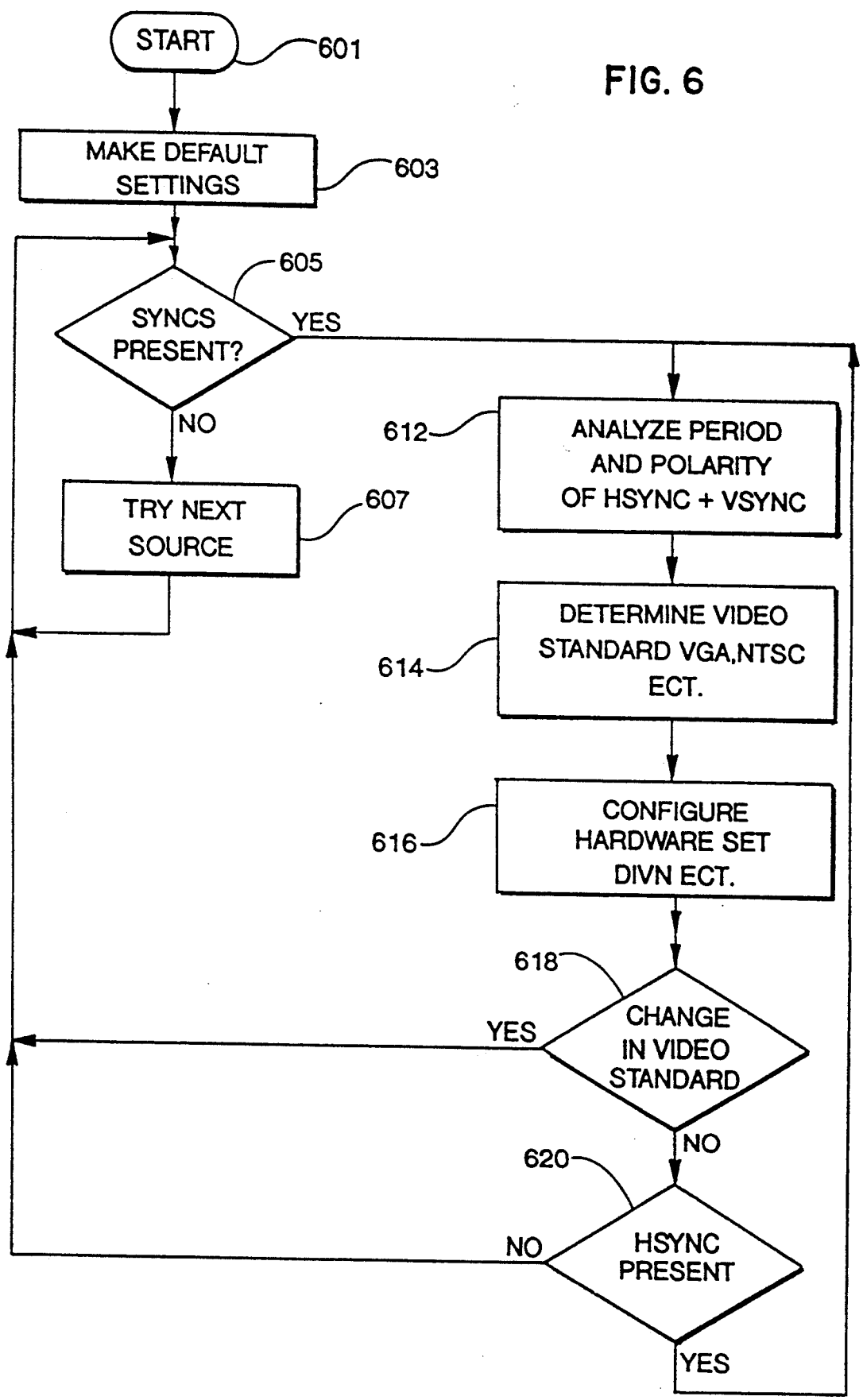
FIG. 6 is a flow diagram of the operation of the microprocessor of the display drive unit of FIG. 1.

Referring now to the flow chart of FIG. 6, when power is applied to the drive unit 11, a CONFIGURE PROGRAM 600 begins in a START instruction 601 and proceeds to an instruction box 603 to set the default settings for the preferred types of video signal source, i.e. NTSC, PAL, VGA GRAPHICS, etc. After the default settings have been established, the program proceeds to a decision instruction 605 in which a determination is made whether the microprocessor is currently receiving an HSYNC signal from the analog multiplex unit 34. If there is no signal being received, the program proceeds to instruction box 607 to cause the analog multiplex control signal MUX CONTROL to be switched allowing the HSYNC and VSYNC signal from another video signal source to be coupled to the microprocessor 36. After the MUX CONTROL signal has been enabled the program returns to decision 605 to once again determine whether an HSYNC is being received from the next selected or enabled source. The above described procedure repeats itself until an enabled video signal source begins sending video synchronization information (HSYNC, VSYNC).

If it is determined at decision instruction 605 that an HSYNC signal is present, the program branches to instruction 612 to cause the microprocessor 36 to analyze the period and polarity of the HSYNC and VSYNC signals respectively. After execution of instruction 612, the program proceeds to instruction 614 where the exact video signal standard is determined by the microprocessor 36 using a conventional comparing technique. Once the video signal standard is determined, the program steps to instruction 616 which configures the programmable divider 69 and programmable counter arrangement 46 by causing the proper sample rate and format count data to be set for formatting purposes. In this regard, the format processor 79 causes the LOAD R signal, LOAD P signal and LOAD L signal each to be enabled, as will be explained hereinafter in greater detail, so that the format data supplied by microprocessor 36 on line 36A can be loaded into each of the counters 73, 75 and 77. Once the programmable divider 69 and programmable counter arrangement 46 has been configured, the program proceeds to decision instruction 618 which determines whether a user has changed the video standard. If the video standard has not been changed, the program waits at instruction 618 until the video source is changed. When the video source is changed, the program proceeds to decision instruction 620 to determine whether the HSYNC signal is being received from the video source. If the HSYNC signal is present, the program goes to instruction 612 and proceeds as previously described. If a HSYNC signal is not present, the program will advance from instruction 620 to decision instruction 605 and proceed as previously described.

Figure 7A:
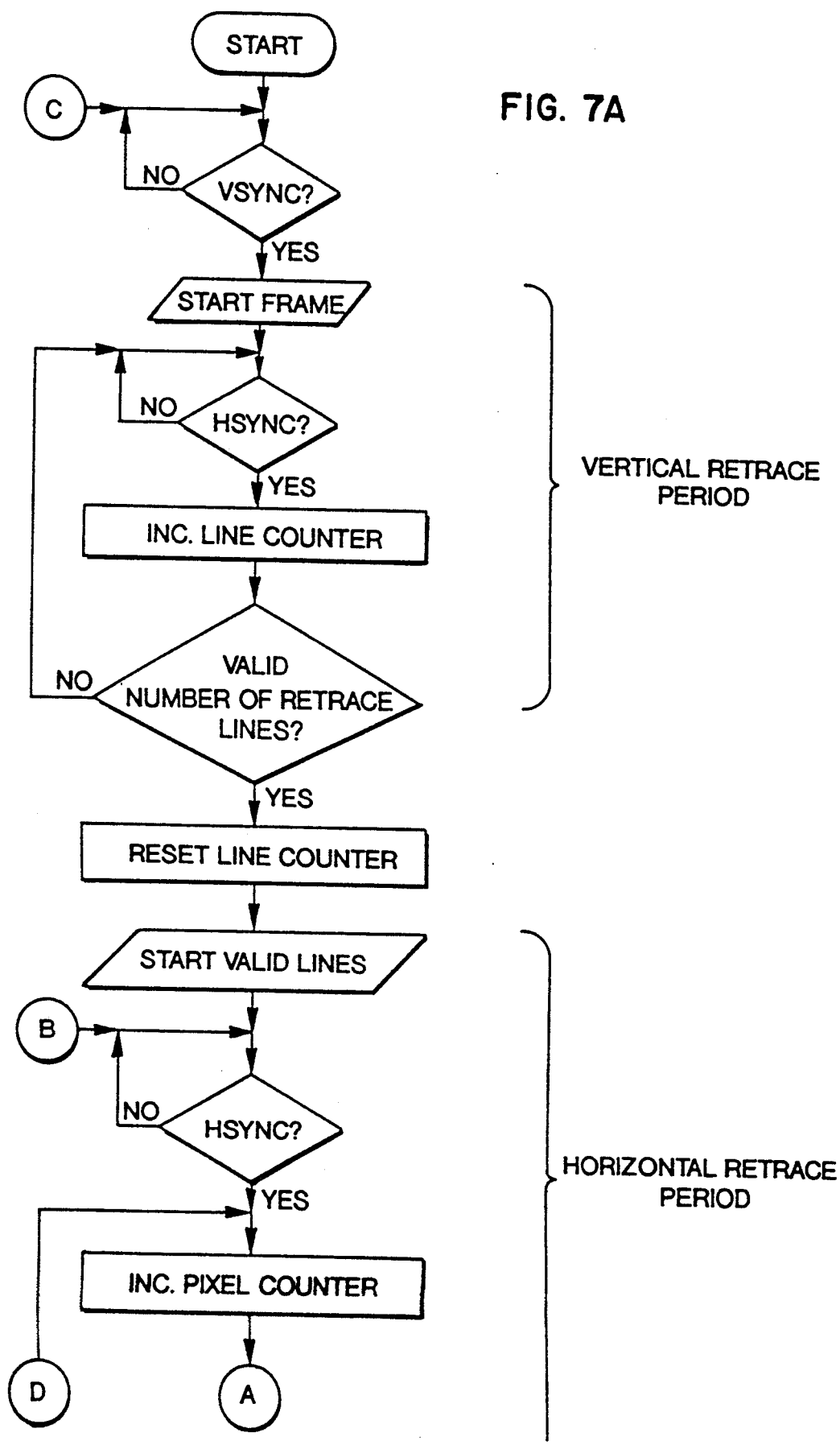
FIGS. 7A-B is a flow chart diagram of the operation of the format processor of the color enhancing controller of FIG. 3.
Figure 7B:
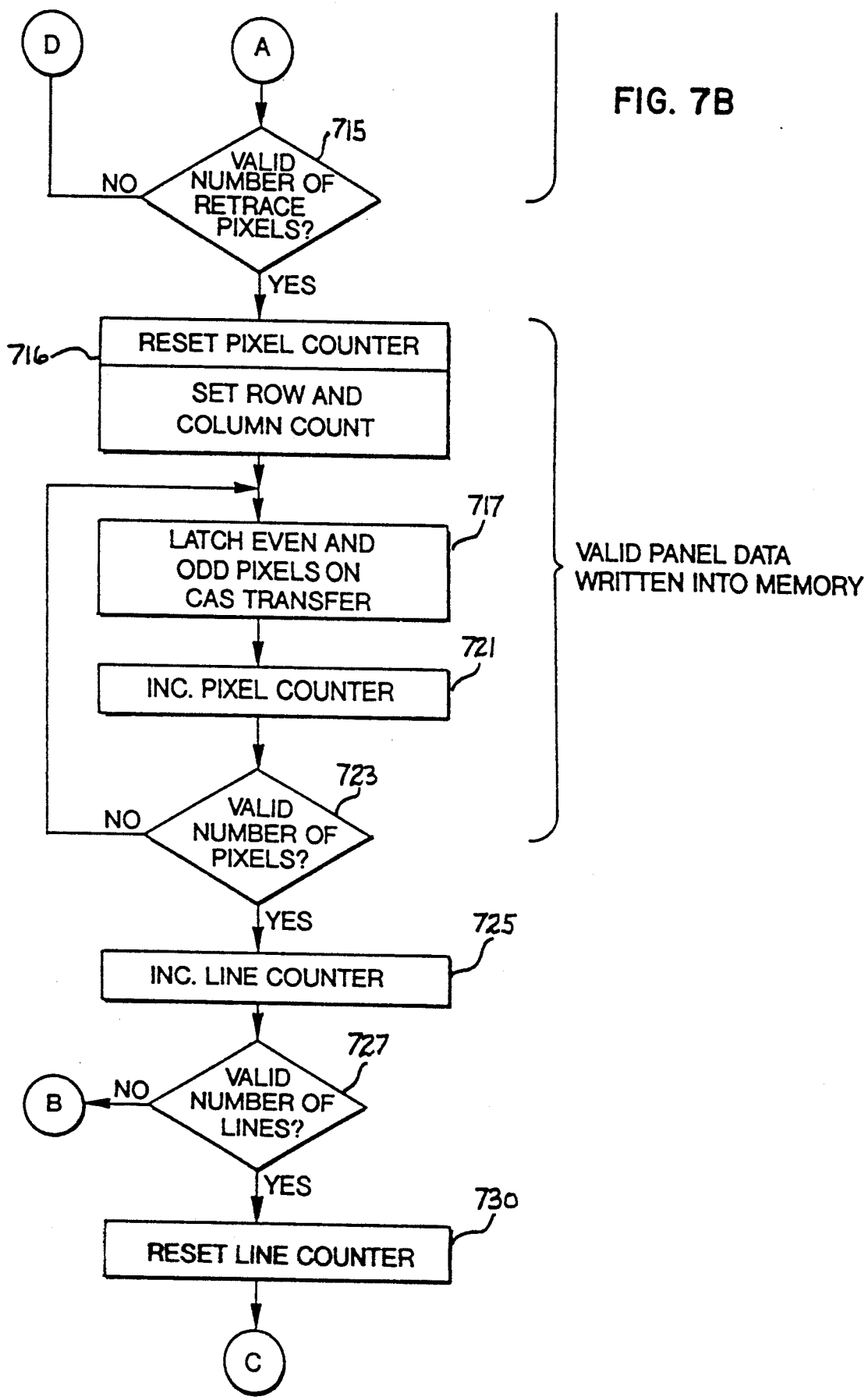

Considering now the operation of the format controller 79 in greater detail with reference to FIG. 7A and 7B, in order for the format controller to properly control the formatting of video data for storage in the various bit map memories in the enhancing units 40, 42 and 44, the microprocessor 36 must first determine (1) the number of vertical retrace lines required for the displayed information; 2) the number of valid or displayable lines in any given frame of displayable information; 3) the number of horizontal retrace pixels between each displayable line of information; and 4) the total number of valid or displayable pixels in each line of displayable information. The microprocessor 36 is preprogrammed to determine the type of video source signal as a function of the HSYNC and VSYNC signal produced by the video source and then to generate the proper counter arrangement 46 data for storing in each of the respective counters 73, 75 and 77 to achieve proper formatting. Table II illustrates the base count information required for converting a VGA and a NTSC video source signal.

TABLE II

| COUNT REQUIREMENT | TYPE OF VIDEO SIGNAL SOURCE | |
|---|---|---|
| | VGA SOURCE | NTSC SOURCE |
| VERTICAL RETRACE LINES/FRAME | 31 | 45 |
| DISPLAYABLE LINES IN FRAME | 480 | 480 |
| HORIZONTAL RETRACE PIXELS | 132 | 192 |
| DISPLAY PIXELS | 640 | 320 |

Once the microprocessor 36 has determined the type of video source signal, the microprocessor 36 sends formatting commands and format data for utilization by the counter arrangement 46.

Referring now to FIG. 7, the format processor 79 upon receiving a configuration or format command starts a FORMAT program 700. The FORMAT program 700 begins in a START instruction 701 and processed to a decision instruction 703 to determine whether a VSYNC signal from the video source is present. If the VSYNC signal is not present, the program waits at decision instruction 703. When the VSYNC signal occurs, the program proceeds to an instruction box 704 to start a vertical retrace period or a new frame by resulting the time counter 77. The program then goes to decision box 705 to determine whether a HSYNC signal is present. If the HSYNC signal is not present the program waits at box 705. When an HSYNC signal occurs the program advances to instruction box 707 to cause the line counter 77 to be incremented. After the line counter 77 has been increment, the program proceeds to a decision instruction 708 to determine whether a valid number of retrace line has occurred. If a valid number of retrace lines has not occurred, the program returns to decision box 705 and proceeds as previously described. In this regard, it should be understood that the first twenty two horizontal lines of data will be disregarded as best seen in FIGS. 8 and 9. If a valid number of retrace lines has occurred, the program advances to instruction 709 to reset the line counter 77. Once the line counter 77 has been reset, the program proceeds to instruction 710 to start a horizontal retrace period for generating the first valid line of the 480 lines to be stored. The program then advances to decision instruction 711 to wait for the next HSYNC signal. If the HSYNC signal is not present, the program waits at decision instruction 711. When the HSYNC signal occurs, the program advances to instruction 713 to increment the pixels counter 75. The program then proceeds, to decision instruction 715 (FIG. 7B) to determine whether a valid number of retrace pixels has occurred. If a valid number of retrace pixels has not occurred, the program returns to instruction 713 (FIG. 7A) and continues as previously described. If a valid number of retrace pixels has occurred, the program advances to instruction 716 to start storing valid video data into the bit map memories of the enhancing units 40, 42 and 44. In this regard, at instruction box 716 the pixel counter 75 is reset and the row and column count is set for utilization by the memory controller 50. After the row and column count has been set, and the pixel counter 75 reset, the program advances to instruction box 717 transfer the row and column count to the memory controller, enables the latching of the even and odd pixels and generates the memory control signals to enable the storing of data into the bit map memories. The control signals (such as the odd enable and even enable signals) for storing data int the individual bit map memories of enhancing units 40, 42, and 44 are more fully described in copending U.S. patent application Ser. No. 07/586,506. As will be explained hereinafter in greater detail, the memory control signals include an interrupt signal when generated by the video controller 18 whenever the video controller 18 requires access to the bit map memories in the enhancing units 40, 42 and 44. In this regard, the Request New Data signal generated by the video controller 18 cause the storing of data via the format timing generator 45 to be temporarily disabled while a line of displayable video data is read from the enhancing units 40, 42 and 44 for display purposes. The interrupt signal from the format timing generator 45 via the memory controller 50 and the memory control store data lines.

After the transfer of the data into memory, the program then proceeds to instruction 721 to increment the pixel counter 75. After the pixel counter 75 has been incremented the program advances to a decision instruction 723 to determine whether a valid number of pixels has been generated by the pixel counter 75. If a valid number has not occurred, the program returns to instruction 717 and repeats the above described sequence. When a valid number of pixels occurs, the program goes from decision instruction 723 to instruction box 725 to increment the line counter 77. After the line counter 77 has been incremented, the program advances to decision instruction 727 to determine whether a valid number of lines has occurred. If the frame is not completed, the program returns to decision instruction 71 (FIG. 7A) to start another line of information as previously described. If the frame is completed, the program goes to instruction 730 and reset the line counter 77. After counter 77 has been reset, the program returns to instruction 703 to wait for the next VSYNC signal.

From the foregoing, it should be understood that the format controller 79 in cooperation with the microprocessor 36 enables a conventional video signal such as a NTSC signal having 525 lines of horizontal video information to be formatted for display into 480 lines of horizontal video information as used by the display device 16. More particularly, the microprocessor 36 and controller 79 cause the 525 lines of horizontal information for each displayable frame of video information to be centered for display in the 640×480 pixel array of panel 16. In this regard, the first twenty two lines of horizontal data are blanked and the last twenty three lines of horizontal data are blanked so that only 480 lines of the horizontal information for each displayable frame of video information is displayed.

This is effective in practice since the majority of the disregarded horizontal lines consists of "overscan" or "invisible" lines and the extreme top and bottom of the displayable frame usually contains little or no displayable video information. For example, referring to FIG. 9B, a timing diagram is illustrated for horizontal line formatting. In this regard, a group of non-valid lines is shown generally at 910 and a group of valid lines are shown generally at 920. The group of non-valid lines 910 are disposed immediately before and immediately after the VSYNC signal goes to a logic high. The first 23 lines before the VSYNC signal and the first 22 lines after the VSYNC signal represent non-valid lines. The VSYNC signal is indicative of the vertical retrace lines. In a similar manner the width of the displayable frame of video information is matched to the 640 lines of the vertical information for each frame by adjusting the sampling rate of the video signal. The sampling or PXCLK rate is set, then a horizontal divisor (ratio of PXCLK to HSYNC rate) is set using the programmable divider 69 to match the horizontal frequency of the television signal produced by the video source. As the signals from the video drive module 26 already have a proper format, the above described formatting technique is not required. In this regard, the microprocessor 36 is coupled to the format timing generator 45 to select the desired format for the video drive module 26.

Considering now the divide by two counter 102, in greater detail with reference to FIG. 5, the divide by two counter 102, divides the pixel or dot clock signal PXCLK in half to produce an output signal having one half the frequency of the dot clock signal. The divide by two counter 102 operate in a manner such that those skilled in the art will understand the operation. Specifically, the divide by two counter 102 divides the pixel clock signal PCLK and produces as an output signal a synchronizing clock signal PCLK2 for helping to sequence the storing of input video data by the enhancing units 40, 42 and 44.

Figure 11:
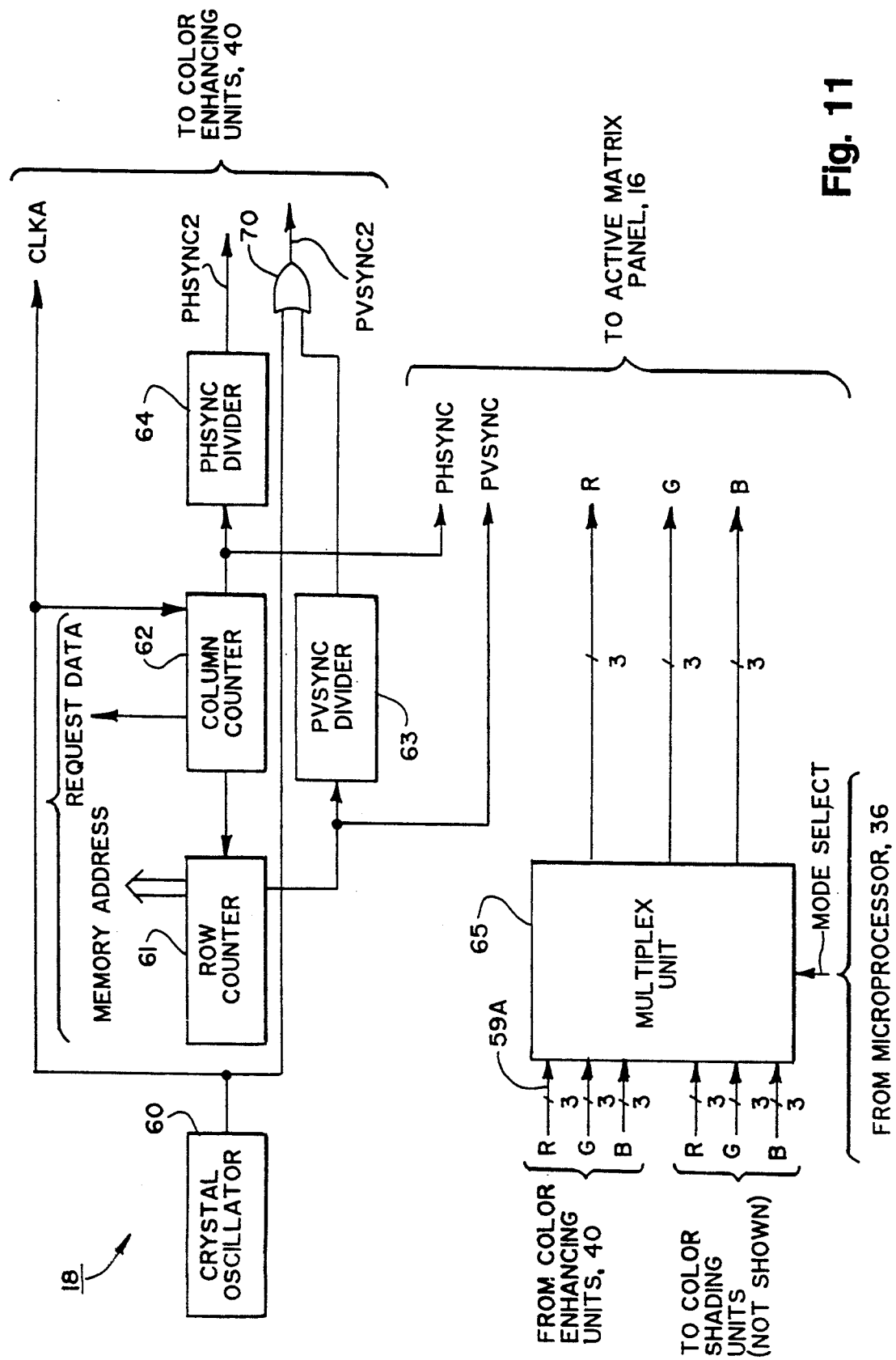
FIG. 11 is a block diagram of a video controller of FIG. 4.

Considering now the memory controller 50 in greater detail with reference to FIG. 11, the memory controller 50 controls the storing and reading of video data from each of the enhancing units 40, 42 and 44. In this regard, the memory controller 50 is more fully described in copending U.S. patent application Ser. No. 07/586,506 and will not be described hereinafter in greater detail except for the interrupting of the format processor 79 (FIG. 5) via an INTERRUPT firmware program 1100 whenever the bit memories of the enhancing units 40, 42 and 44 are accessed by the video controller 18.

Considering now the video controller 18 in greater detail with reference to FIG. 11, the video controller 18 includes a row counter 61 and a column counter 62 which generated the PHSYNC and PVSYNC signals used by the panel 16 as well as the memory address and request data signals used by the memory controller 50 to control the retrieval of the video data from the enhancing unit 40, 42 and 44. In this regard, whenever the row counter 61 reaches its terminal count, it generates the PVSYNC signal, and whenever the column counter 62 reaches its terminal count it generates the PHSYNC signal. The PHSYNC and PVSYNC signals are used by the panel 16 to control the display of video information.

As will be explained hereinafter in greater detail, the video controller 18 also includes a pair of dividers 63 and 64 for dividing the frequency of the respective PHSYNC and PVSYNC signals by two in order to help facilitate the comparison of pixel patterns for color shading purposes. The frequency of the above mentioned signals (PHSYNC and PVSYNC) is divided in half for data retrieval purposes by a pair of dividers 63 and 64 respectively.

For the purpose of helping to reduce, if not substantially eliminate flicker patterns, the video controller also includes an exclusive or gate 100 (FIG. 11). The exclusive "or" gate generates a flicker inhibit signal PVSYNC2, for synchronizing the video data output from a pattern logic component 59 (FIG. 5A), which is described in greater detail hereinafter. As best seen in FIG. 11, the gate 70 has two inputs, one from the divide by two counter 64 and the other one from the panel video clock oscillator 60.

The video controller 18 also includes a mode select multiplexer 111 and a firmware INTERRUPT program 1100. More particularly, as video data is loaded into each of the respective enhancing units 40, 42 and 44 on a line by line basis, it should be understood that cooperation is required between the format timing generator 45 and its formatting of data for storage into the enhancing units 40, 42 and 44, and the video controller 18 and its reading of the formatted data from the bit map memory in the enhancing units 40, 42 and 44. The above-mentioned cooperation or handshaking is accomplished through the INTERRUPT firmware program 1100.

The video controller 18 also includes a mode select multiplexer 111 for multiplexing data to the panel 16 from other color shading units (not shown). In this regard, the mode select multiplexer 111 in greater detail with reference to FIG. 5A, the mode select multiplexer 111 permits a user, via the infrared receiver 38 to select the format of video data to be displayed. In this regard, the system may display video data from either a television signal source mode or a computer video output signal source mode.

Considering now the INTERRUPT program 1100 in greater detail with reference to FIGS. 4 and 11, whenever the video controller 18 requires video data for display purposes, the video controller 18 generates an interrupt control signal on the request new data line buss between the video controller 18 and the memory controller 50. The interrupt control signal starts the INTERRUPT firmware program 1100. In this regard, the INTERRUPT firmware program 1100 starts at box 1101 and advances to instruction box 1103 which halts or interrupts the storing of data into the bit map memories of the enhancing units 40, 42 and 44. The program then advances to instruction box 1105 which enables the memory address lines from the row counter in the video controller 18 to be placed on the address buss for the enhancing units 40, 42 and 44. The address buss for the enhancing units 40, 42 and 44 is a common address buss shared by the format timing generator memory addressing and the video controller memory addressing.

After the memory address lines have been enabled, the memory controller 50 generates the RAS signal at instruction box 1107 transferring the row counter into the VRAMs or bit map memories of the enhancing units 40, 42 and 44. The program then advances to instruction box 1109 which disables the memory address buss from being controlled by video controller 18. The program then proceeds to instruction box 1111 and outputs all zeros onto the address buss via the memory controller 50. The program then goes to instruction 1113 where the memory controller enables the CAS signal to cause the column position to be coupled to the bit map memories of the enhancing units 40, 42 and 44. The program then proceeds to instruction 1115 and loads the video data into the respective bit map memories in each enhancing unit 40, 42 and 44 for access by the video controller 18. In this regard, it should be understood that an entire row of video data is loaded into the respective bit map memories for display purposes. After the video data has been loaded into the bit map memories, the program advances to instruction 1117 to acknowledge that the loading of the memory has been completed which is indicative that a new line of data may now be displayed on the active matrix panel 16. More particularly, the PHSYNC produced by the column counter 62 is driven to a logical low level and remains low until the column counter 62 in the video controller 18 reaches its terminal count indicating that another new line of video data is required. When another line of data is required, another interrupt signal is generated. It should be understood that when the request new data signal is generated by the video controller 18, the PHSYNC goes to an active level.

After the acknowledgement of loading the bit map memories is completed, the program goes to instruction 1119 which returns control of the memory address buss to the format timing generator 45. The program then advances to instruction 1121 which enables the row and column count in the format timing generator 45 to be set as previously described. The program then proceeds to box 1123 which causes the FORMAT program 700 to be resumed from where it was interrupted.

Considering now the enhancing units 40, 42 and 44 with reference to FIG. 4, only one enhancing unit, enhancing unit 40, will be described in greater detail as each of the enhancing units 40, 42 and 44 are substantially similar to one another.

Figure 5A:
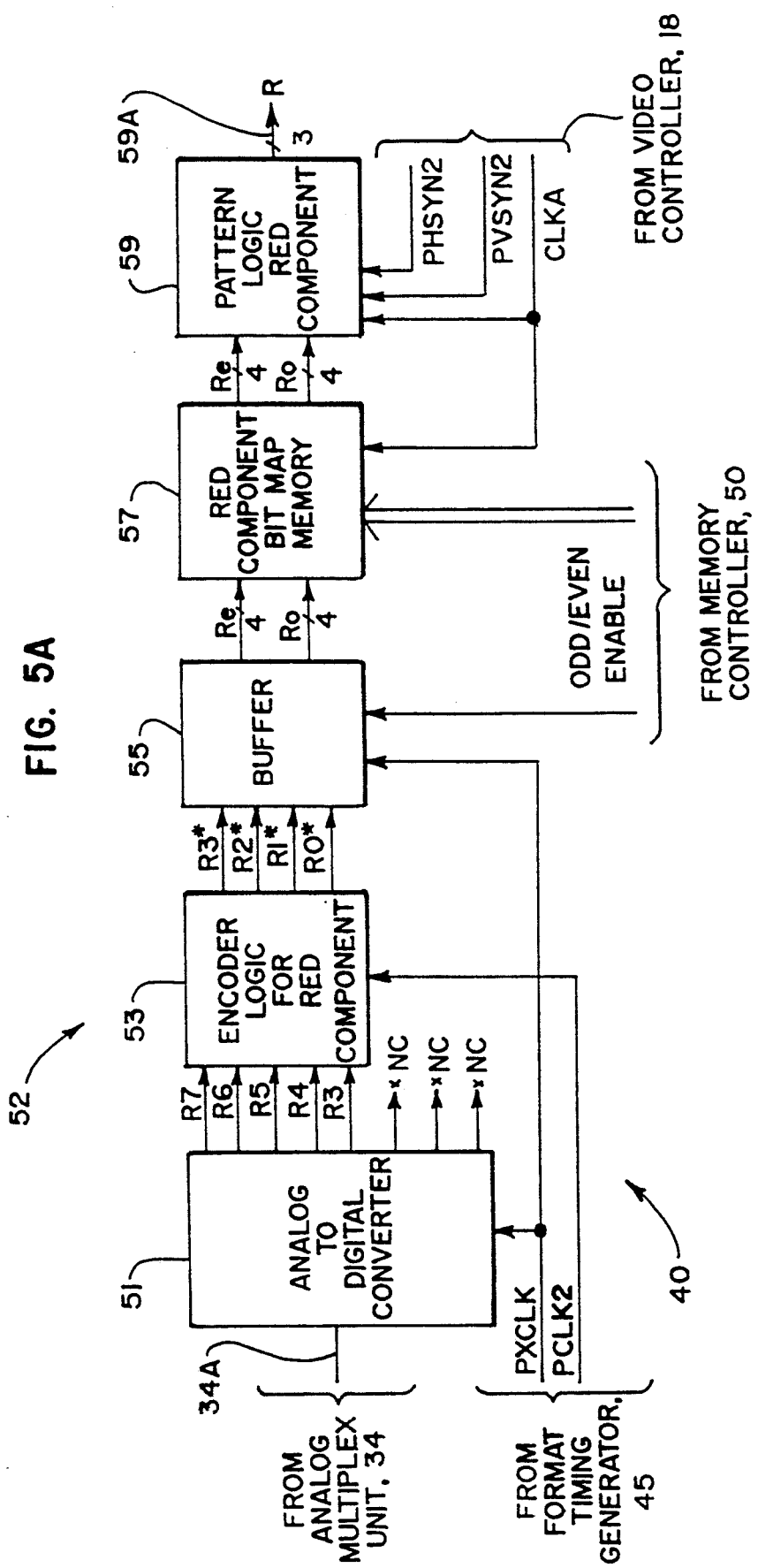
FIG. 5A is a block diagram of an enhancing unit of FIG. 4.

Considering now the color enhancing unit 40 in greater detail with reference to FIGS. 4 and 5A, the color enhancing unit 40 generally comprises an analog to digital converter 51 for converting the red component of the raw RGB analog signal into a digital signal for processing and storage purposes by an encoder arrangement 52 and a bit map memory 57 respectively.

The encoder arrangement 52 includes an encoder logic unit 53 coupled between the output of the analog to digital converter 51, and the input of an output buffer unit 55 for temporarily storing or latching the video data to be stored into the bit map memory 57. The enhancing unit 40 also includes a pattern logic unit 59 connected between the bit map memory 57 and the video controller 18 for forming video data to enable individual pixel elements to be activated.

The analog to digital converter 51, the buffer 55, and the bit map memory 57 are substantially similar to the corresponding units more fully described in copending U.S. patent application, Ser. No. 07/616,178 and will not be described hereinafter in greater detail.

Figure 5B:
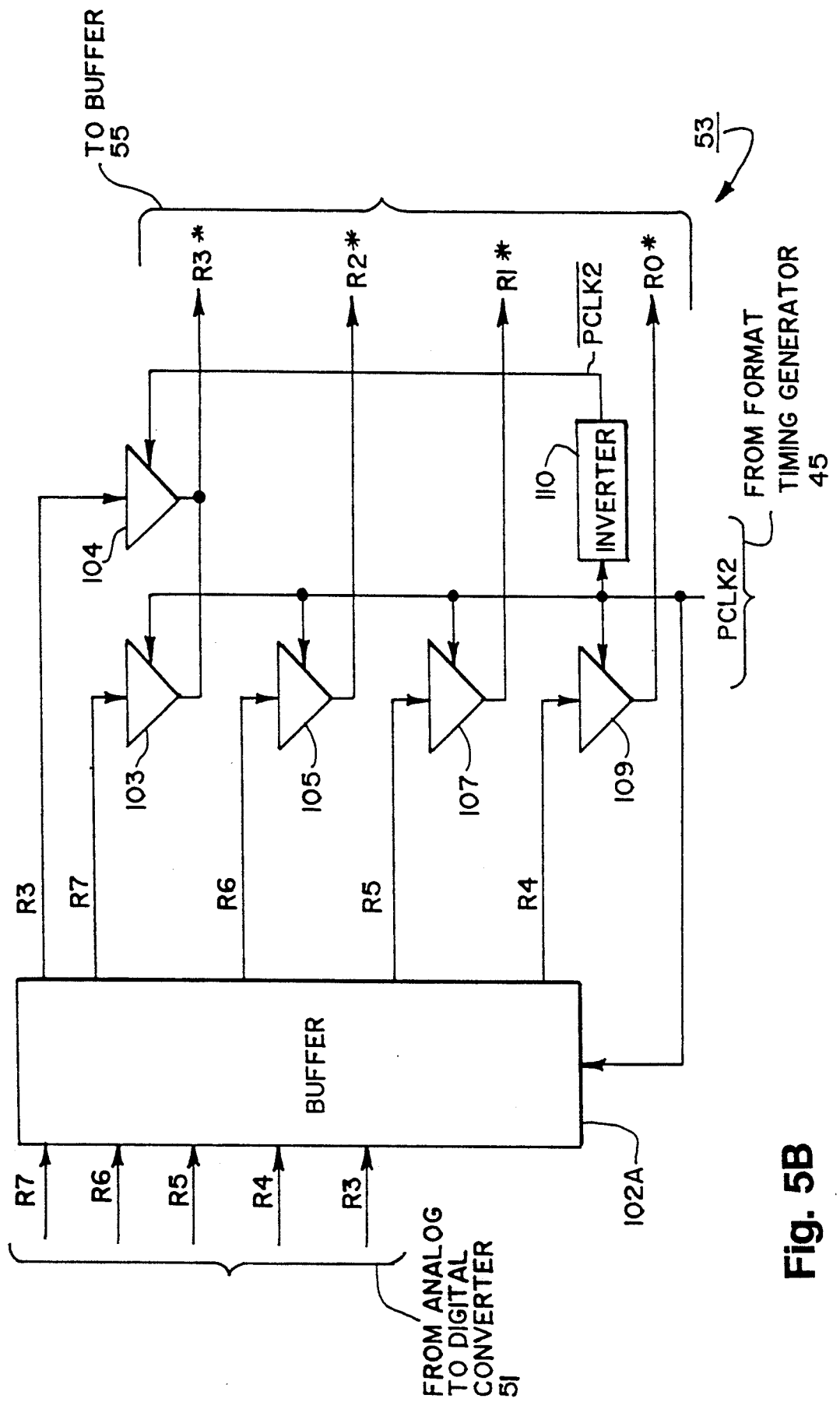
FIG. 5B is a schematic diagram of the encoder logic for the enhancing unit of FIG. 5A.

Considering now the encoder logic unit 53, with reference to FIG. 5A and 5B, the encoder logic unit 53 generally includes an input buffer unit 102A and an array of tri-state buffers gates 103–109 for quantizing the input signal from the analog to digital converter 51 in a multiplexing technique. In this regard, the encoder arrangement 52, quantizes each 8-bit digitized video signal into a 4-bit quantized video signal consisting of the signals R0*, R1*, R2*, and R3*.

As best seen in FIG. 5A, the unit 53 also includes an invertor 110 for helping to multiplex the digital information for storage into the bit map memory 57 via the buffer 55. In this regard, although the analog to digital converter 51, on every pixel clock (PXCLK), converts each analog signal into a digital signal, only every other converted signal is latched into the buffer 55, as will be explained hereinafter in greater detail.

In order to transfer the digitized data from the analog to digital converter 51 to the encoder arrangement 52, the output signals (R7-R3) from the analog to digital converter 51 are coupled to the input buffer 102A on every PCLK2 signal. The output signals (R7-R4) from the buffer 102A, in turn, are coupled to the inputs of gates 103, 105, 107 and 109 respectively, while the output signal R3 from the buffer 102A is coupled to gate 104. Each of the gates 103, 105, 107 and 109 are enabled by the clock signal PCLK2 produced by the divide by the two counter 102 in the format timing generator 45, while gate 104 is enabled by the clock signal, $\overline{PLCK2}$ supplied by the invertor 110.

In operation, as will be explained hereinafter in greater detail, the encoder logic unit 53 quantizes and encodes the input video data for processing by the pattern logic unit 59 in order to combine video pixel element signals to form a low resolution composite pixel to increase the number of displayable color shadings. In this regard, the encoder logic 53 reduces or quantizes the amount of data that is stored in the bit map memory 56 by disregarding the three least significant bits for each pixel element location and by enabling only the data for every other pixel element to be latched in the buffer 102A. In this regard, when data is latched into the buffer 102A on the leading edge of the PCLK2 signal, the four most significant bits of the latched digital signal (e.g. R7-R4) are latched into the output buffer 55, as signals R3*-R0* respectively.

In a similar manner, on the trailing edge of the PCLK2 signal the fourth most significant bit of the latched digital signal (e.g. R3) is latched into the output buffer 55, (the other digital signals disregarded). From the foregoing it should be understood that an even byte of video data consisting of 4 bits is temporarily stored in the buffer 55, along with an odd byte of video data also consisting of 4 bits of which only one bit (e.g. R3*) is of significance for processing purposes (e.g. the other three bits) have been disregarded for processing purposes as will be explained hereinafter in greater detail.

Considering now the pattern logic unit 59 in greater detail, with reference to FIG. 5A and Table III, the pattern logic unit 59 comprises a XILINX unit programmed to produce weighted pixel intensities levels according to the truth table shown in Table III. In this regard, the pattern logic unit 59 is coupled between the bit map memory 57 and the video controller 18 for processing the data stored in the bit map memory 57 to increase the number of displayable 15 shading levels of the red component of video data from 8 levels to 29 levels. More particularly, the pattern logic unit 59 in cooperation with the video controller 18 considers the intensity level of individual pixels elements in specific pixel element groupings to generate weighted intensity level panel pixels. In this regard, the pattern logic unit 59 in cooperation with the video controller 18, retrieves data from the bit map memory 57 for energizing selected pixel elements in the display panel matrix 16. In this regard, the pattern logic unit 59 compares each five bits of data retrieved from bit map memory 57 relative to an array group or grouping of four pixel elements such a pattern group (FIG. 12) forming single composite panel pixel, such as the panel pixel 300 (FIG. 12) forming.

As explained earlier the encoder arrangement 52 quantizes the NTSC digital video signal by encoding each eight-bit digital signal into a five-bit digital signal indicative of a given color component for a panel pixel. Also as explained earlier, the encoder arrangement 52 also ignores every other NTSC digital video signal. As the encoder arrangement 52 ignores every other panel pixel element for quantizing purposes, each frame of displayed information in the active matrix panel 16 will contain certain columns of pixel elements, such as pixel elements 230 and 231 respectively that will be assigned arbitrary intensity level based upon the input data from the bit map memory 57. Because of such quantizing, it can best be seen in FIGS. 12 that a pattern array is established in the pixel groupings, to define composite pixel groups, such as groups 300–305 (FIG. 12). Each composite group consists of four pixel elements. As will be explained hereinafter in greater detail, the pattern logic 59 will selectively energize one or more of the pixel elements in each composite group, such as composite group 300, to form a composite pixel image. It should be understood however, that a set of four possible pixel elements, such as pixel elements 230, 225, 230 and 231 may be active in one of the grouping, such as the grouping 300 at one time. However, as the human eye is incapable of distinguishing the individual pixel elements in the rows and columns from one another, the grouping of pixel elements are utilized to define the single composite panel pixel image having in excess of twenty four thousand different shading levels. Stated otherwise, the selectively activated pixel elements 220, 225, 234 and 231 are combined to form a weighted intensity level of 29 different levels for the red component (as well as the blue and green components) of a given composite panel pixel, such as the panel pixel 300. In a similar manner, other pixel elements such as pixel elements 221, 227, 232 and 223 are also combined to form other composite panel pixels, such as the composite pixel 302.

From the foregoing it should be understood that although the liquid crystal panel 16 normally provides only 8 shades for each of the principal primary colors of red, green and blue, the pattern logic 59, the combining of video pixel element signals enables in excess of 24 thousand possible color shading combinations for each composite pixel in the active matrix panel 16.

The aforementioned pixel element combining process is possible because the standard NTSC signal is developed for displaying a color image in a pixel element matrix of 320 by 480 pixel elements whereas the active matrix display panel 16, is capable of displaying a color image in a pixel element matrix of 640 by 480 pixel element matrix. Accordingly, the video data supplied via the analog to digital converter 51 includes twice the amount of information that is actually displayed by the panel 16 thus, permitting the combining process.

Figure 13:
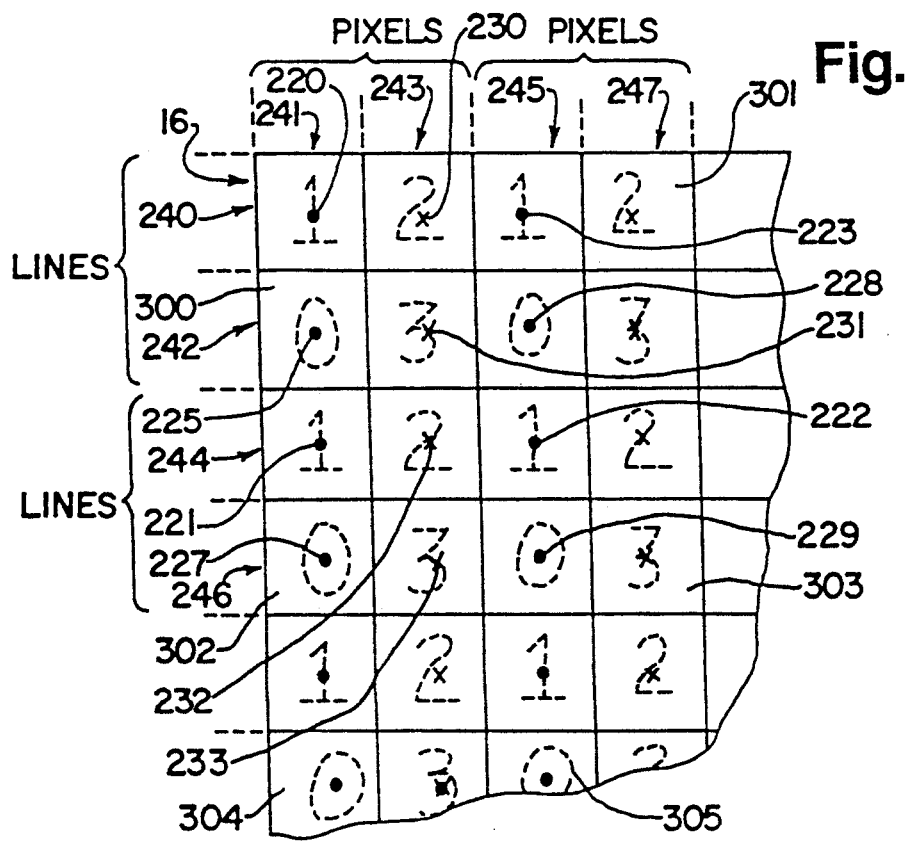
FIG. 13 is another diagrammatic representation of a group of pixel elements within the active matrix panel 16 of FIG. 4, illustrating a phase reversal.

Considering now the pattern logic 59 in greater detail with reference to FIGS. 12 and 13, as each panel pixel element is addressed, such as the panel pixel element 220, a location signal (PIXEL and LINE) is generated indicative of a quadrant location 0, 1, 2 or 3, for the addressed panel pixel element in the grouping such as the grouping 300. In this regard, the grouping 300 is configured in a 2×2 matrix array of rows (LINE) and columns (PIXEL) having four quadrant locations 0, 1, 2 and 3.

The location signal is then logically combined in the pattern logic 59 with the quantized data retrieved from the bit map memory 57, identified as i4, i3, i2, i1 and i0, (Table III) according to the following equations:

$$!pd2 = (!i4 \,\&\, pixel \,\&\, !line$$
$$\# \,!i0 \,\&\, !i4 \,\&\, !line$$
$$\# \,!i1 \,\&\, !i4 \,\&\, pixel$$
$$\# \,!i1 \,\&\, !i4 \,\&\, !line$$
$$\# \,!i0 \,\&\, !i1 \,\&\, !i4$$
$$\# \,!i2 \,\&\, !i4$$
$$\# \,!i3 \,\&\, !i4);$$
$$!pd1 = (!i0 \,\&\, !i3 \,\&\, !line$$
$$\# \,!i1 \,\&\, !i3 \,\&\, pixel$$
$$\# \,!i1 \,\&\, !i3 \,\&\, !line$$
$$\# \,!i0 \,\&\, !i1 \,\&\, !i3$$
$$\# \,i0 \,\&\, i1 \,\&\, i2 \,\&\, i3 \,\&\, !i4 \,\&\, !pixel$$
$$\# \,i0 \,\&\, i2 \,\&\, i3 \,\&\, !i4 \,\&\, !pixel \,\&\, line$$
$$\# \,!i2 \,\&\, !i3);$$
$$!pd0 = (!i1 \,\&\, !i2 \,\&\, pixel$$
$$\# \,!i1 \,\&\, !i2 \,\&\, !line$$
$$\# \,i0 \,\&\, i1 \,\&\, i2 \,\&\, !i3 \,\&\, !pixel$$
$$\# \,i0 \,\&\, i2 \,\&\, !i3 \,\&\, !pixel \,\&\, line$$
$$\# \,i1 \,\&\, i2 \,\&\, !i4 \,\&\, line$$
$$\# \,i0 \,\&\, i2 \,\&\, !i4 \,\&\, !pixel \,\&\, line$$
$$\# \,!i2 \,\&\, pixel \,\&\, !line$$
$$\# \,i0 \,\&\, i1 \,\&\, i2 \,\&\, !i4 \,\&\, !pixel$$
$$\# \,i1 \,\&\, i2 \,\&\, !i3 \,\&\, line$$
$$\# \,!i0 \,\&\, !i2 \,\&\, !line$$
$$\# \,!i0 \,\&\, !i1 \,\&\, !i2);$$

where the signals !pd2, !pd1, and !pd0 are indicative of the bit red component signal (R) shown generally at 59A (FIG. 11). The intensity of the color emitted from each panel pixel element, such as a panel pixel element 220, is thus dependent upon the four even bits $R_e$ and the one odd bit $R_O$ retrieved from the bit map memory 57, identified as input data i4, i3, i2, i1 and i0, combined with the pixel (PIXEL) and a line (LINE) location.

Considering now the Table III in greater detail, Table III is a truth table which represents the operation of the pattern logic unit 59. The truth table comprises three columns, an input data column, a location data column, and an output data column. It should be noted that the data in the truth table is given in base 10 representation rather than base 2.

The following examples are designed to illustrate how the truth table functions.

EXAMPLE 1

The input bits i4, i3, i2, i1 and i0 are $00000_2$ or $0_{10}$. The PIXEL and LINE bits are $00_e$ or $0_{10}$. With these bits as input data the pattern logic unit 59 computes the output data, pd2, pd1 and pd0 according to the equations given above. In this example, the output bits are $000_2$ or $0_{10}$, as shown in column three of the truth table. Note that in this example, where the input bits i4, i3, i2, i1 and i0 are $00000_2$ or $0_{10}$, the output bits will always be $0_{10}$, the output bits will always be $0_{10}$, no matter what the value of PIXEL and LINE may be.

EXAMPLE 2.

The input bits i4, i3, i2, i1 and i0 are $01101_2$ or $13_{10}$. The PIXEL and LINE bits are $00_2$ or $0_{10}$. From column three, output data, of the truth table the output bits pd2, pd1, and pd0 are determined to be $011_2$ or $3_{10}$.

EXAMPLE 3

The input bits i4, i3, i2, i1 and i0 are $01101_2$ or $13_{10}$ as in EXAMPLE 2. However, PIXEL and LINE bits have a value of $11_2$ or $3_{10}$. The output bits pd2, pd1, and pd0 are determined to be $011_2$ or $3_{10}$.

EXAMPLE 4

The inputs bits i4, i3, i2, i1 and i0 are $10100_2$ or $20_{10}$. As in EXAMPLE 1, the value of the output bits pd2, pd1, and pd0 in this example are not dependent upon the value of the PIXEL and LINE bits. In this EXAMPLE the output will be $101_2$ or $5_{10}$ regardless of the value of PIXEL and LINE.

Using the above examples as guides, one skilled in the art will be able to determine the value of all the possible output data bits pd2, pd1, and pd0 which establishes the intensity level of each of the color components for any given panel pixel element, such as the panel pixel element 120, based upon the input data bits i4, i3, i2, i1 and i0 PIXEL and LINE.

TABLE III

| PATTERN LOGIC UNIT 59 TRUTH TABLE | | |
| --- | --- | --- |
| INPUT DATA (i4, i3, i2, i1, i0) | LOCATION (pixel, line) | OUTPUT DATA (pd2, pd1, pd0) |
| 0 | 0 | 0 |
| 0 | 1 | 0 |
| 0 | 2 | 0 |
| 0 | 3 | 0 |
| 1 | 0 | 0 |
| 1 | 1 | 1 |
| 1 | 2 | 0 |
| 1 | 3 | 0 |
| 2 | 0 | 0 |
| 2 | 1 | 1 |
| 2 | 2 | 0 |
| 2 | 3 | 1 |
| 3 | 0 | 1 |
| 3 | 1 | 1 |
| 3 | 2 | 0 |
| 3 | 3 | 1 |
| 4 | 0 | 1 |
| 4 | 1 | 1 |
| 4 | 2 | 1 |
| 4 | 3 | 1 |
| 5 | 0 | 1 |
| 5 | 1 | 2 |
| 5 | 2 | 1 |
| 5 | 3 | 1 |
| 6 | 0 | 1 |
| 6 | 1 | 2 |
| 6 | 2 | 1 |
| 6 | 3 | 2 |
| 7 | 0 | 2 |
| 7 | 1 | 2 |
| 7 | 2 | 1 |
| 7 | 3 | 2 |
| 8 | 0 | 2 |
| 8 | 1 | 2 |
| 8 | 2 | 2 |
| 8 | 3 | 2 |
| 9 | 0 | 2 |
| 9 | 1 | 3 |
| 9 | 2 | 2 |
| 9 | 3 | 2 |
| 10 | 0 | 2 |
| 10 | 1 | 3 |
| 10 | 2 | 2 |
| 10 | 3 | 3 |
| 11 | 0 | 3 |
| 11 | 1 | 3 |
| 11 | 2 | 2 |
| 11 | 3 | 3 |
| 12 | 0 | 3 |
| 12 | 1 | 3 |
| 12 | 2 | 3 |
| 12 | 3 | 3 |
| 13 | 0 | 3 |
| 13 | 1 | 4 |
| 13 | 2 | 3 |
| 13 | 3 | 3 |
| 14 | 0 | 3 |
| 14 | 1 | 4 |
| 14 | 2 | 3 |
| 14 | 3 | 4 |
| 15 | 0 | 4 |
| 15 | 1 | 4 |
| 15 | 2 | 3 |
| 15 | 3 | 4 |
| 16 | 0 | 4 |
| 16 | 1 | 4 |
| 16 | 2 | 4 |
| 16 | 3 | 4 |
| 17 | 0 | 4 |
| 17 | 1 | 5 |
| 17 | 2 | 4 |
| 17 | 3 | 4 |
| 18 | 0 | 4 |
| 18 | 1 | 5 |
| 18 | 2 | 4 |
| 18 | 3 | 5 |
| 19 | 0 | 5 |
| 19 | 1 | 5 |
| 19 | 2 | 4 |
| 19 | 3 | 5 |
| 20 | 0 | 5 |
| 20 | 1 | 5 |
| 20 | 2 | 5 |
| 20 | 3 | 5 |
| 21 | 0 | 5 |
| 21 | 1 | 6 |
| 21 | 2 | 5 |
| 21 | 3 | 5 |
| 22 | 0 | 5 |
| 22 | 1 | 6 |
| 22 | 2 | 5 |
| 22 | 3 | 6 |
| 23 | 0 | 6 |
| 23 | 1 | 6 |
| 23 | 2 | 5 |
| 23 | 3 | 6 |
| 24 | 0 | 6 |
| 24 | 1 | 6 |
| 24 | 2 | 6 |
| 24 | 3 | 6 |
| 25 | 0 | 6 |
| 25 | 1 | 7 |
| 25 | 2 | 6 |

TABLE III-continued

PATTERN LOGIC UNIT 59 TRUTH TABLE

| INPUT DATA (i4, i3, i2, i1, i0) | LOCATION (pixel, line) | OUTPUT DATA (pd2, pd1, pd0) |
|---|---|---|
| 25 | 3 | 6 |
| 26 | 0 | 6 |
| 26 | 1 | 7 |
| 26 | 2 | 6 |
| 26 | 3 | 7 |
| 27 | 0 | 7 |
| 27 | 1 | 7 |
| 27 | 2 | 6 |
| 27 | 3 | 7 |
| 28 | 0 | 7 |
| 28 | 1 | 7 |
| 28 | 2 | 7 |
| 28 | 3 | 7 |
| 29 | 0 | 7 |
| 29 | 1 | 7 |
| 29 | 2 | 7 |
| 29 | 3 | 7 |
| 30 | 0 | 7 |
| 30 | 1 | 7 |
| 30 | 2 | 7 |
| 30 | 3 | 7 |
| 31 | 0 | 7 |
| 31 | 1 | 7 |
| 31 | 2 | 7 |
| 31 | 3 | 7 |

FIG. 13 is similar to FIG. 12 except that the phase of the assigned pixel locations 0, 1, 2, 3 has been reversed in order to reduce, if not substantially eliminate pattern formation is between successive frames of displayed information. Phase reversal is produced through the video controller 18, and more specifically the exclusive or gate 70. In this regard, the or gate 100 generates the flicker inhibit signal PVSYNC2 which reverses the assigned columns and lines as shown in dotted line FIG. 12 to conform to the assigned columns and lines as shown in dotted line FIG. 13. Such phase reversal occurs every other frame.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method for enhancing the number of image color shading levels produced by a display device in response to a video signal, said video signal for driving an X by Y matrix of pixel image producing devices, and said display device having an m by n matrix array of pixel elements, where m and n are substantially smaller than X and Y respectively, comprising:

receiving and reformatting the video signal into a display input signal for driving the m by n matrix of pixel elements, said input signal being indicative of N number of desired shading levels for the pixel elements in them by n matrix of pixel elements;

assigning pairs of gray scale codes to corresponding adjacent pairs of pixel elements in said m by n matrix, where one of the gray scale codes is indicative of one of an M number of shading levels and the other one of the gray scale codes is indicative of one of a P number of shading levels, and where N is substantially equal to M times P;

energizing selectively certain ones of the pixel elements an average number of times over a large number of successive frame time period intervals to produce pixel images having M number of different shading levels of individual ones of a plurality of individual colors;

energizing selectively certain other ones of the pixel elements adjacent to the last mentioned pixel elements an another average number of times over said large number of successive frame time period intervals to produce pixel images having P number of different shading levels of individual ones of said plurality of individual colors; and controlling the energizing of said pixel elements to cause a composite pixel image to be displayed by the display device every frame period, said composite pixel image having a composite shading level substantially equal to the desired one of the N shading levels.

2. A method according to claim 1, further comprising:

preventing said display input signal from driving a boundary portion of said X by Y matrix of pixel image producing devices; and inhibiting said display input signal from driving another boundary portion of said X by Y matrix of pixel image producing devices, so that the resulting displayed image is conformed to an image area defined by the m by n matrix array of pixel elements.

3. A mthod according to claim 2, further comprising:

responding to said display input signal for forming every frame period an individual pixel image having a large number N of possible intensity levels, where said large number N is greater than 2 to substantially prevent contouring between intensity levels of the same primary color.

4. A method for enhancing the number of color shading intensity levels produced by a display device having a pixel element matrix array of a plurality of liquid crystal pixel elements, comprising:

determining any one of N number of desired incoming color intensity levels for a pixel image to be displayed;

generating a coded signal indicative of any one of an M number of duty cycle intensity levels substantially less than said one of N number of desired incoming color intensity levels;

generating another coded signal indicative of any one of a P number of duty cycle intensity levels substantially less than said any one of N number of desired color intensity levels independently of the determined M number;

storing said coded signals to facilitate energizing pairs of adjacent pixel elements in the pixel element matrix array; and generating a single-bit signal to cause a selected one of the adjacent pixel elements to be energized an average M number of times over a large number of successive frame time periods to produce a sub-pixel image having a given one of the M number of different duty cycle intensity levels where M is greater than one;

generating another single-bit signal to cause another selected one of the adjacent pixel elements to be energizing an average P number of times over a large number of successive frame time periods to produce a sub-pixel image having a given one of the P number of different color intensity levels where P is greater than one;

whereby adjacent sub-pixel images having M and P numbers of different duty cycle intensity levels are combined and perceived by a viewer as a single pixel image having a selected one of N number of desired incoming color intensity levels.

5. A color shade enhancing arrangement for a pixel element matrix array of a plurality of liquid crystal pixel elements, comprising:

means for determining any one of N number of desired incoming color intensity levels for a pixel image to be displayed;

means for generating a coded signal indicative of any one of an M number of duty cycle intensity levels substantially less than said one of N number of desired incoming color intensity levels;

means for generating another coded signal indicative of any one of a P number of duty cycle intensity levels substantially less than said any one of N number of desired color intensity levels independently of the determined M number;

composite pixel arranger means for storing said coded signals to facilitate energizing pairs of adjacent pixel elements in the pixel element matrix array; and duty cycle means coupled to said composite pixel arranger means for generating a single-bit signal to cause a selected one to the adjacent pixel elements to be energized an average M number of times over a large number of successive frame time periods to produce a sub-pixel image having a given one of the M number of different duty cycle intensity levels where M is greater than one;

said duty cycle means generating another single-bit signal to cause another selected one of the adjacent pixel elements to be energizing an average P number of times over a large number of successive frame time periods to produce a sub-pixel image having a given one of the P number of different duty cycle intensity levels where P is greater than one;

whereby adjacent sub-pixel images having M and P numbers of different duty cycle intensity levels are combined and perceived by a viewer as a single pixel image having a selected one of N number of desired incoming color intensity levels.

6. A color shade enhancing arrangement according to claim 5, wherein said plurality of liquid crystal pixel elements form part of a display device, and wherein said pixel element matrix array is arranged in an m by n matrix array.

7. A color shade enhancing arrangement as recited in claim 6, wherein said display device is a liquid crystal display device.

8. A color shade enhancing arrangement as recited in claim 7, wherein said liquid crystal display device is an active matrix thin film transistor liquid crystal display panel.

9. A color shade enhancing arrangement as recited in claim 8, wherein each pixel element of said plurality of pixel elements has a set of three subpixel components.

10. A shade enhancing arrangement as recited in claim 9, wherein each subpixel component is indicative of a different color for producing a large number of color shades by a combining process as each subpixel component is driven to one of eight levels by said pixel element energizing signals.

11. A shade enhancing arrangement as recited in claim 10, wherein said combining process is a color additive process.

12. A shade enhancing arrangement as recited in claim 10, wherein said combining process is a color subtractive process.

13. A color shade enhancing arrangement according to claim 6, further comprising:

means for receiving a composite television video signal indicative of an image to be displayed, said means for receiving including signal conversion means for converting said composite television signal into at least two sets of analog video signals and analog to digital conversion means for converting said analog video signals into at least two groups of digital signals, each digital signal being indicative of a desired pixel image color shading intensity level; and wherein said means for determining includes scaling means coupled to said analog to digital conversion means for quantizing each group of digital signals into pairs of quantized digital signals to help form a plurality of low resolution composite pixel images, each composite pixel image being formed by a composite pixel element array and having N possible color shading levels.

14. A color shade enhancing arrangement according to claim 13, further comprising:

means for reformatting the video signal into a display input signal for driving the m by n matrix array of pixel elements, said input signal coupled to said means for determining and being indicative of individual ones of the N number of desired shading levels for individual ones of the pixel elements in the m by n matrix array of pixel elements.

15. An arrangement according to claim 14, wherein said means for reformatting includes:

signal conversion means responsive to the video signal for producing a liquid crystal driving signal to help facilitate forming a television image on the display device, said display device having an X by Y matrix of pixel image producing devices and said display device having an m by n matrix array of pixel elements, where m and n are substantially smaller than X and Y respectively;

image inhibiting means responsive to the video signal for preventing said liquid crystal driving signal from driving a boundary portion of said X by Y matrix of pixel image producing devices; and image format means responsive to the video signal for preventing said driving liquid crystal signal from driving another boundary portion of said X by Y matrix of pixel image producing devices, so that the resulting displayed image is conformed to an image area defined by the m by n matrix array of pixel elements.

16. An arrangement according to claim 15, further comprising:

means responsive to said liquid crystal driving signal for forming an individual pixel image every frame period having a large number N of possible intensity levels, where said large number N is greater than 2 to substantially prevent contouring between intensity levels of the same primary color.

17. A color shade enhancing arrangement according to claim 14
wherein said composite pixel arranger means includes:

means for generating pixel element location signals indicative of the location of the individual pixel element images in each composite pixel image;

bit map memory means for storing temporarily said pairs of quantized digital signals; and pattern logic means for retrieving selected pairs of the quantized digital signals and for generating pixel element energizing signals when the individual pairs of the quantized digital signals have a given relationship with a corresponding pair of said pixel element location signals so that certain ones of the plurality of pixel elements are energized to form every frame period an individual one of the composite pixel images to help produce a full color image.

18. A color shade enhancing arrangement according to claim 17, further comprising:

means for substantially eliminating extraneous beat patterns and flicker in said full color image.

19. A color shade enhancing arrangement as recited in claim 17, wherein said scaling mean includes:

buffer means for temporarily storing each digital signal in each group of said digital signals for quantizing purposes; and encoder means coupled to said buffer means for quantizing every other digital signal in each group of digital signals into the pairs of quantized digital signals without introducing any substantial quantization errors.

20. A color shade enhancing arrangement as recited in claim 17, wherein said pattern logic means includes:

means coupled to the bit map memory means for retrieving the stored quantized digital signals; and means for formatting the retrieved quantized digital signals with a video clock signal to drive said display device.

21. A color shade enhancing arrangement as recited in claim 20, wherein said means for formatting includes:

temporary storage means for storing said quantized digital signals; and video signal generating means coupled to said temporary storage means for producing a group of formatted binary video signals for driving the display device;

said binary video signals defining color shading levels for individual ones of the pixel images produced by the display device.

22. A shade enhancing arrangement as recited in claim 21, wherein said group of formatted binary signals includes three binary signals indicative of a large number of different color shading levels.

23. A shade enhancing arrangement as recited in claim 22, wherein said large number is at least 29 different shading levels for a single primary color.

* * * * *

UNITED STATES PATENT AND TRADEMARK OFFICE
CERTIFICATE OF CORRECTION

PATENT NO. : 5,300,944

DATED : April 5, 1994

INVENTOR(S) : Shapiro et al.

It is certified that error appears in the above-indentified patent and that said Letters Patent is hereby corrected as shown below:

Column 1, line 12, before "now U.S. Pat.", delete ",".

Column 1, line 16, before "now", delete ",".

Column 1, line 21, before "now abandoned", delete ",".

Column 1, line 25, before "now abandoned", delete ",".

Column 1, line 29, before "now abandoned", delete ",".

Column 4, line 59, before "and 3", insert --2--.

Column 4, line 59, before "The", insert --. --.

Column 5, line 1, after "ing", insert --. --.

Column 9, line 56, after "controller", insert --79--.

UNITED STATES PATENT AND TRADEMARK OFFICE
CERTIFICATE OF CORRECTION

PATENT NO. : 5,300,944
DATED : April 5, 1994
INVENTOR(S) : Shapiro et al.

It is certified that error appears in the above-indentified patent and that said Letters Patent is hereby corrected as shown below:

Column 13, line 6, after "instruction", delete "711", and substitute therefor --71--.

Column 17, line 12, after "displayable", delete "15".

Column 21, line 59, delete "them", and substitute therefor --the m--.

Column 22, line 29, delete "mthod" and substitute therefor --method--.

Signed and Sealed this

Twenty-eight Day of March, 1995

Attest:

BRUCE LEHMAN

Attesting Officer

Commissioner of Patents and Trademarks